United States Patent
Ohtomo et al.

[11] Patent Number: 6,123,397
[45] Date of Patent: Sep. 26, 2000

[54] BRAKE FLUID PRESSURE CONTROL DEVICE

[75] Inventors: Akihiro Ohtomo; Akira Sakai; Fumiaki Kawahata; Hirohiko Morikawa; Kiyoharu Nakamura, all of Toyota, Japan

[73] Assignee: Toyota Jidosha Kabushiki Kaisha, Toyota, Japan

[21] Appl. No.: 08/936,289

[22] Filed: Sep. 24, 1997

[30] Foreign Application Priority Data

Sep. 27, 1996 [JP] Japan .................................. 8-256393

[51] Int. Cl.⁷ ...................................................... B60T 8/88
[52] U.S. Cl. .................................. 303/122.05; 303/116.1; 303/119.1; 303/122.09
[58] Field of Search ........................ 303/122.08, 122.09, 303/122.1, 122.11, DIG. 3, DIG. 4, 122.05, 122.14, 166, DIG. 1, 116.1, 119.1, 116.2, 113.1

[56] References Cited

U.S. PATENT DOCUMENTS

| | | | |
|---|---|---|---|
| 3,936,095 | 2/1976 | Every | 303/122.14 |
| 4,484,784 | 11/1984 | Leiber | 303/122.08 |
| 4,736,992 | 4/1988 | Hendrickson | 303/122.1 |
| 5,261,730 | 11/1993 | Steiner et al. | 303/113.4 |
| 5,333,944 | 8/1994 | Shirai et al. | 303/113.4 |
| 5,568,962 | 10/1996 | Enomoto et al. | 302/152 |
| 5,647,647 | 7/1997 | Kato et al. | 303/122.09 |
| 5,671,981 | 9/1997 | Sasaki et al. | 303/122.09 |
| 5,868,473 | 2/1999 | Kato et al. | 303/122.09 |
| 5,951,120 | 9/1999 | Shimura et al. | 303/122.05 |
| 5,979,997 | 11/1999 | Ohkubo et al. | 303/122.09 |

FOREIGN PATENT DOCUMENTS

| | | |
|---|---|---|
| 3829949 | 3/1990 | Germany . |
| 4102497 | 5/1992 | Germany . |
| 4-218458 | 8/1992 | Japan . |
| 6-35842 | 9/1994 | Japan . |

*Primary Examiner*—Robert J. Oberleitner
*Assistant Examiner*—Thomas J. Williams
*Attorney, Agent, or Firm*—Kenyon & Kenyon

[57] ABSTRACT

In a brake fluid control device, front wheel cylinders are connected to a front hydraulic circuit, and rear wheel cylinders are connected to a rear hydraulic circuit. The front hydraulic circuit and the rear hydraulic circuit are connected to a front left pressure-decrease valve, a front right pressure-decrease valve, a rear left pressure-decrease valve, a rear right pressure-decrease valve and a connecting pipe. When a brake pedal is depressed, the front left pressure-decrease valve, the front right pressure-decrease valve, the rear left pressure-decrease valve and the rear right pressure-decrease valve are opened and a master cylinder pressure sensor leads to both the front hydraulic circuit and the rear hydraulic circuit. Comparing a detection value of the of the master cylinder pressure sensor, a detection value of a front wheel cylinder pressure sensor and a detection value of a rear wheel cylinder pressure sensor respectively, detects the state of operation of each of the sensors provided in the system.

17 Claims, 13 Drawing Sheets

FIG. 5

| MODE NO. | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| MCV | OFF | | | | | ON | | | | | | | | | | | | |
| F IN L/V | | | | | | | | | | | | | | | | | | |
| F OUT L/V | | | | | | | | | | | | | | | | | | |
| R IN L/V | | | | | | | | | | | | | | | | | | |
| R OUT L/V | | | | | | | | | | | | | | | | | | |
| FCV | | | | | | | | | | | | | | | | | | |
| RCV | | | | | | | | | | | | | | | | | | |
| FLHV | | | | | | | | | | | | | | | | | | |
| FLDV | | | | | | | | | | | | | | | | | | |
| FRHV | | | | | | | | | | | | | | | | | | |
| FRDV | | | | | | | | | | | | | | | | | | |
| RLHV | | | | | | | | | | | | | | | | | | |
| RLDV | | | | | | | | | | | | | | | | | | |
| RRHV | | | | | | | | | | | | | | | | | | |
| RRDV | | | | | | | | | | | | | | | | | | |
| RVCV | | | | | | | | | | | | | | | | | | |
| NORMAL OPERATION STATUS | PR UP | PR DW | PR DW | PR DW | PACC DW | PF UP | PF DW | PF DW | PR DW | PR UP RE | PR DW | PR DW | PR UP RE | PR DW | PF DW | PF UP RE | PF DW | PF DW |

BRAKE FLUID PRESSURE CONTROL DEVICE

BACKGROUND OF THE INVENTION

1. Field of the Invention

The present invention generally relates to brake fluid pressure control devices, and in particular, to a brake fluid pressure control device which functions to control brake fluid pressure in a hydraulic circuit connected to wheels of an automotive vehicle.

2. Description of the Related Art

As disclosed in Japanese Laid-Open Patent Application No. 4-218458, there is known a brake fluid pressure control device that electrically controls a brake fluid pressure supplied to a wheel cylinder. Such a brake fluid pressure control device is provided with a master cylinder which generates a brake fluid pressure (hereinafter known as the master cylinder pressure $P_{M/C}$) in accordance with a brake pedal pressure, a brake pedal sensor which detects the brake pedal pressure, a $P_{W/C}$ sensor which detects the brake fluid pressure (hereinafter called the wheel cylinder pressure $P_{W/C}$) supplied to the wheel cylinder, and a high pressure source which is controlled on the basis of the value detected by the brake pedal sensor and the detection value of the $P_{W/C}$ sensor.

When the system is operating normally, the wheel cylinder is in line with the high pressure source. The high pressure source is controlled so that the wheel cylinder pressure $P_{W/C}$ is a brake fluid pressure equal to the brake pedal pressure multiplied by a required magnification factor. In such a configuration, it is possible for the wheel cylinder to generate a sufficiently large braking force on the vehicle wheel in response to the brake pedal pressure.

When the detection value for the brake pedal sensor and the detection value for the $P_{W/C}$ sensor do not satisfy the normal relationship, it can be determined that a malfunction has occurred in the system. When a malfunction has occurred in the system, the high pressure source is separated from the wheel cylinder and the master cylinder is brought in line with the wheel cylinder. According to this configuration, when there is a malfunction, the master cylinder pressure $P_{M/C}$ is supplied to the wheel cylinder so that the wheel cylinder produces a sufficiently large braking force on the wheel.

In a conventional brake fluid pressure control device as disclosed in the above-mentioned publication, when it is determined that there is a malfunction in the system, the electrical control of the brake fluid pressure using the high pressure source is always stopped and manual control is commenced using the master cylinder. However, under conditions when a defect occurs in only one of a plurality of sensors provided in the system, there are many cases in which the normally functioning sensors can be used to perform the electrical control of the brake fluid pressure using the high pressure source. Accordingly, when a malfunction is detected in the system, it is desired to accurately detect the status of operation of the plurality of sensors provided in the system. If the detection of the sensor operation status is provided, it becomes possible to provide a reliable electrical control for the system under a wide range of conditions.

SUMMARY OF THE INVENTION

Accordingly, an object of the present invention is to provide a brake fluid pressure control device which enables the accurate detection of the status of operation of sensors provided in the system.

The above-mentioned object of the present invention is achieved by a brake fluid pressure control device in which a first-system hydraulic circuit and a second-system hydraulic circuit are provided, a first-system wheel cylinder is linked to the first-system hydraulic circuit, and a second-system wheel cylinder is linked to the second-system hydraulic circuit, the brake fluid pressure control device comprising: a first-system wheel cylinder pressure sensor which detects a wheel cylinder pressure of the first-system wheel cylinder; a second-system wheel cylinder pressure sensor which detects a wheel cylinder pressure of the second-system wheel cylinder; a connection path between the first-system wheel cylinder and the second-system wheel cylinder, the connection path controlling a status of connection between the first-system wheel cylinder and the second-system wheel cylinder; a hydraulic pressure source sensor which detects a brake fluid pressure generated by a hydraulic pressure source; and a sensor operation status determination unit which is linked to the first-system wheel cylinder and the second-system wheel cylinder and under conditions when the hydraulic pressure source generates a fluid pressure, compares detection values of the hydraulic pressure source sensor, the first-system wheel cylinder pressure sensor and the second-system wheel cylinder pressure sensor and determines a status of operation of the hydraulic pressure sensor, the first-system wheel cylinder pressure sensor, and the second-system wheel cylinder pressure sensor.

In the present invention when the connecting path is open, the first-system hydraulic circuit and the second-system hydraulic circuit are connected. If the hydraulic pressure source generates a fluid pressure in this situation, then that fluid pressure is supplied to both the first-system wheel cylinder and the second-system wheel cylinder. In this case, if the first-system wheel cylinder pressure sensor and the second-system wheel cylinder pressure sensor and the fluid pressure sensor are all normal, then the values detected by each of the sensors will be approximately the same. The sensor operation status determination unit determines that all of the sensors are operating normally if their respective detection values are all substantially the same.

In the brake fluid pressure control device of the present invention, the circuit defect detection unit is provided to detect defects in the first-system hydraulic circuit, the second-system hydraulic circuit and the connection path. The brake fluid pressure control device is effective in preventing erroneous detection of sensor operation status due to hydraulic line defects.

In the brake fluid pressure control device of the present invention, the connection path is provided with a connecting pipe, a first-system pressure decrease valve which opens and closes the connecting pipe to and from the first-system wheel cylinder, and a second-system pressure decrease valve which connects and disconnects the connecting pipe to and from the second-system wheel cylinder, and a connecting pipe defect detection unit. The brake fluid pressure control device is effective in preventing erroneous detection of sensor operation status caused by defects in the connecting piping or hydraulic lines.

In the present invention, if fluid pressure is supplied to the first-system wheel cylinder in the status where the first-system pressure decrease value is closed, then the fluid generated by that hydraulic pressure source does not reach the connection piping. However, when the first-system pressure decrease valve is open and the second-system pressure decrease valve is closed and hydraulic pressure is supplied to the first-system wheel cylinder, it is possible for the hydraulic pressure generated by that hydraulic pressure source to reach the connecting piping. It is possible to determine that there is a leak in the connecting pipe or line if the fluid pressure obtained by the first-system wheel cylinder pressure sensor is a low pressure in a first case, or proportional to the fluid pressure obtained by the first-system wheel cylinder pressure sensor in a second case. The connection pipe defect detection unit determines that there is a defect in the connection pipe in such cases.

BRIEF DESCRIPTION OF THE DRAWINGS

The above and other objects, features and advantages of the present invention will become more apparent from the following detailed description when read in conjunction with the accompanying drawings in which:

FIG. 5 is a time chart for explaining the processing of step 212 shown in FIG. 4;

DESCRIPTION OF THE PREFERRED EMBODIMENTS

A description will now be given of the preferred embodiments of the present invention with reference to the accompanying drawings.

Figure 1:
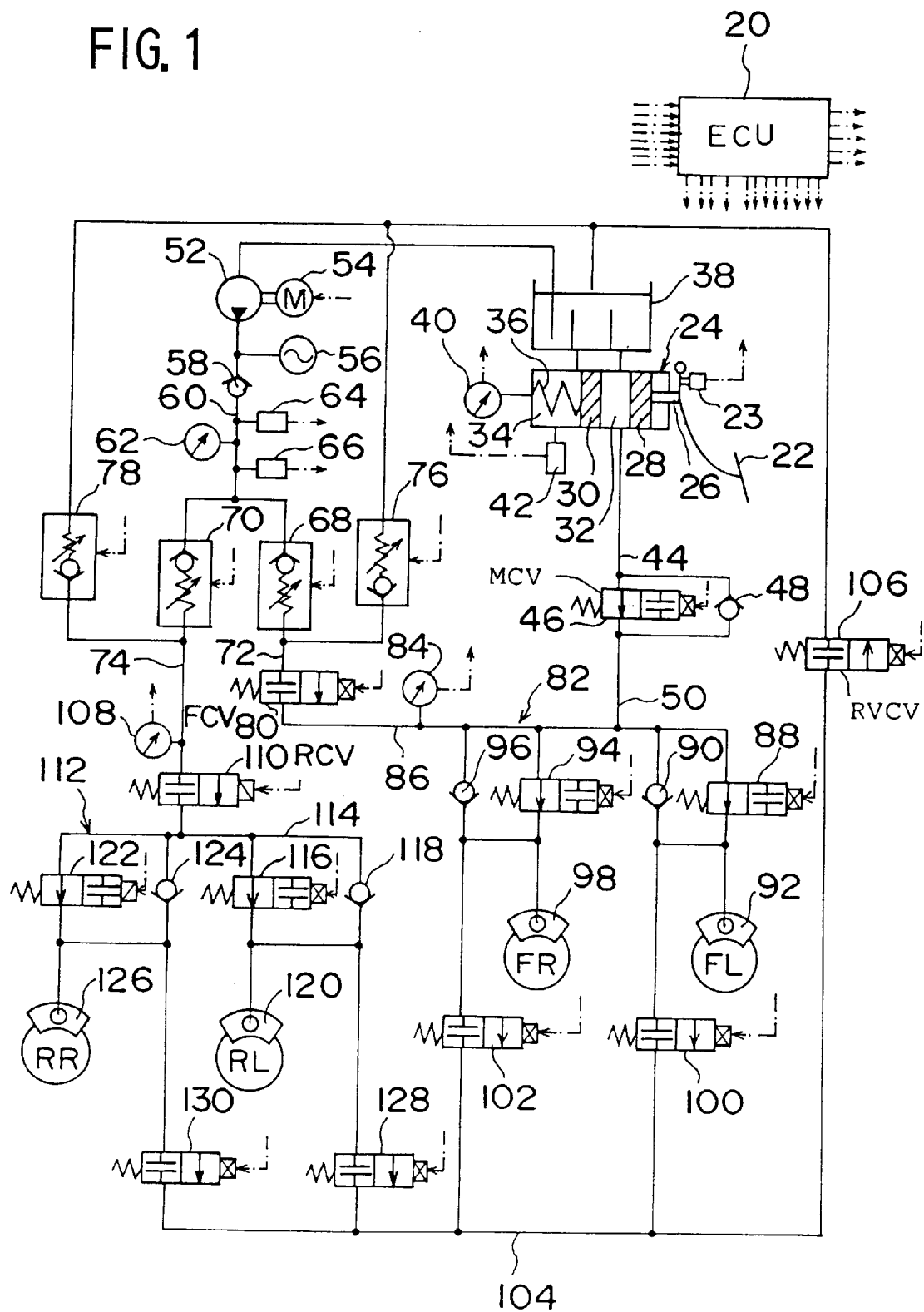
FIG. 1 is a block diagram of a system to which one embodiment of a brake fluid pressure control device of the present invention is applied.

FIG. 1 shows the configuration of a brake system to which one embodiment of a brake fluid pressure control device of the present invention is applied. The brake fluid pressure control device is provided with an electronic control unit 20 (hereinafter called ECU 20). The brake fluid pressure control device is controlled by the ECU 20.

The brake fluid pressure control device is provided with a brake pedal 22. Close to the brake pedal 22 is a brake switch 23. The brake switch 23 generates an ON output when the brake pedal 22 is depressed. The output signals of the brake switch 23 are supplied to the ECU 20. The ECU 20 uses the output status of the brake switch 23 to determine whether or not to execute a brake operation.

The brake pedal 22 is linked to the input 26 of the master cylinder 24. This master cylinder 24 is provided with a first piston 28 and a second piston 30. The first piston 28 is linked to the input 26. Between the first piston 28 and the second piston 30 a first hydraulic chamber 32 is formed. In addition, between the second piston 30 and the bottom surface of the master cylinder 24 a second hydraulic chamber 34 is formed. A spring 36 which urges the second piston 30 towards the side of the brake pedal 22 is provided to the second hydraulic chamber 34.

To the upper portion of the master cylinder 24 is arranged a reserve tank 38. Brake fluid is filled to this reserve tank 38. The first hydraulic chamber 32 and second hydraulic chamber 34 of the master cylinder 24 are connected to this reserve tank 38 only in cases when the first piston 28 and the second piston 30 are positioned at the primary position. Accordingly, brake fluid is filled to the first hydraulic chamber 32 and the second hydraulic chamber 34 every time pressure is released from the brake pedal 22.

A master cylinder pressure sensor 40 (hereinafter called a $P_{M/C}$ sensor 40) and a pressure switch 42 are linked to the master cylinder 24 and the second hydraulic chamber 34. The $P_{M/C}$ sensor 40 outputs an electrical signal corresponding to the internal pressure of the second hydraulic chamber 34. The output signal of the $P_{M/C}$ sensor 40 is supplied to the ECU 20. The ECU 20 detects the master cylinder pressure $P_{M/C}$ on the basis of the output signal of the $P_{M/C}$ sensor 40. The pressure switch 42 generates an ON output when the internal pressure of the second hydraulic chamber 34 exceeds a certain required value. The output signal of the pressure switch 42 is supplied to the ECU 20.

A hydraulic path 44 is connected to the first hydraulic chamber 32 of the master cylinder 24. The hydraulic path 44 is connected to a hydraulic path 50 via a master cylinder cut valve 46 (hereinafter called MCV 46) and a one-way valve 48. The MCV 46 is a two-position solenoid valve which is usually maintained in a valve open status. The MCV 46 is set in a closed status when a drive signal from the ECU 20 is supplied thereto. In addition, the one-way valve 48 is a valve which only allows fluid to flow in the direction away from the hydraulic path 44 and towards the hydraulic path 50.

The brake fluid pressure control device of the present invention is provided with a pump 52 as a high pressure source. The pump 52 is provided with an actuating motor 54 as a high pressure source actuator. The operation of the motor 54 is controlled by the ECU 20. The inlet to the pump 52 is connected to the reserve tank 38. In addition, the discharge outlet of the pump 52 is connected to an accumulator 56 and also connected to a high pressure path 60 via a one-way valve 58.

An accumulator pressure sensor 62 (hereinafter called a $P_{ACC}$ sensor 62 is linked to the high pressure path 60. The $P_{ACC}$ sensor 62 outputs an electrical signal corresponding to the internal pressure of the high pressure path 60. The output signal of the $P_{ACC}$ sensor 62 is supplied to the ECU 20. The ECU 20 detects the internal pressure of the high pressure path 60 on the basis of the output signals of the $P_{ACC}$ sensor 62, which is to say that it detects the pressure (hereinafter called the accumulator pressure $P_{ACC}$) that is stored in the accumulator 56.

An upper limit switch 64 (hereinafter called ULSW 64) and a lower limit switch 66 (hereinafter called LLSW 66) are connected to the high pressure path 60. The ULSW 64 gives an ON output when the internal pressure of the high pressure path 60 that is the accumulator pressure $P_{ACC}$ is above the upper limit value of the set usable region. The LLSW 66 gives an ON output when the internal pressure of the high pressure path 60 that is the accumulator pressure $P_{ACC}$ is less than the lower limit value of the set usable region. The output signal of the upper limit switch 64 and the output signal of the lower limit switch 66 are supplied to the ECU 20. When the ON output is given by the lower limit switch 66, the ECU 20 then supplies a drive signal to the motor 54 for the duration that the ON output is being given by the upper limit switch 64. According to this processing, the accumulator pressure $P_{ACC}$ is maintained within the set usable region.

The high pressure path 60 is connected to a front pressure increase linear valve 68 (hereinafter called $F_{IN}$ L/V 68) and a rear pressure increase linear valve 70 (hereinafter called $R_{IN}$ L/V 70). The $F_{IN}$ L/V 68 and the $R_{IN}$ L/V 70 are connected to the front hydraulic path 72 and the rear hydraulic path 74 respectively. The front hydraulic path 72 is connected to the reserve tank 38 via a front pressure decrease linear valve 76 (hereinafter called $F_{OUT}$ L/V 76). In addition, the rear hydraulic path 74 is connected to the reserve tank 38 via a rear pressure decrease linear valve 78 (hereinafter called $R_{OUT}$ L/V 78).

The $F_{IN}$ L/V 68, the $R_{IN}$ L/V 70, the $F_{OUT}$ L/V 76 and the $R_{OUT}$ L/V 78 maintain their closed state when drive signals are not supplied from the ECU 20, and are effectively opened in accordance with drive signals, when drive signals are supplied from the ECU 20. The $F_{IN}$ linear valve 68 enables the amount of flow of fluid into the front hydraulic path 72 from the high pressure path 60 to be linearly controlled. In addition, the $F_{OUT}$ linear valve 76 enables the amount of flow from the front hydraulic path 72 to the reserve tank 38 to be linearly controlled. In the same manner, the $R_{IN}$ linear valve 70 allows the flow of fluid from the high pressure path 60 to the rear hydraulic path 74 to be linearly controlled, and in addition, the $R_{OUT}$ linear valve 78 allows the flow of fluid from the rear hydraulic path 74 to the reserve tank 38 to be linearly controlled.

The front hydraulic path 72 is connected to the front hydraulic circuit 82 via the front cut valve 80 (FCV 80). The FCV 80 is a two-position solenoid valve that is closed in its normal status. The FCV 80 opens when a drive signal is supplied from the ECU 20. When the FCV 80 is in the open status, brake fluid flows from the front hydraulic path 72 to the front hydraulic circuit 82.

The front hydraulic circuit 82 is also connected to the hydraulic path 50 described above. When the MCV 46 is in the open status, the master cylinder 24 and the hydraulic path 50 are linked. In this case, brake fluid at the pressure of the master cylinder pressure $P_{M/C}$ is directed to the front hydraulic circuit 82.

When the MCV 46 is in the closed state, only the master cylinder 24, hydraulic path 50 and one-way valve 48 are linked. In this case, if the master cylinder pressure $P_{M/C}$ is relatively high with respect to the internal pressure of the front hydraulic circuit 82, the internal pressure of the front hydraulic circuit 82 is raised until it is the same as the master cylinder pressure $P_{M/C}$. On the other hand, if the master cylinder pressure $P_{M/C}$ is relatively low with respect to the internal pressure of the front hydraulic circuit 82, the internal pressure of the front hydraulic circuit 82 is maintained at a value different than that for the master cylinder pressure $P_{M/C}$.

The front hydraulic circuit 82 is provided with a front wheel cylinder pressure sensor 84 (hereinafter known as $P_F$ sensor 84). The $P_F$ sensor 84 is connected to a connecting path 86 which connects to the hydraulic path 50. The $P_F$ sensor 84 output an electrical signal in accordance with the internal pressure of the connecting path 86. The output signal of the $P_F$ sensor 84 is supplied to the ECU 20. The ECU 20 detects the internal pressure of the connecting path 86 on the basis of the output signals of the $P_F$ sensor 84.

The connecting path 86 is connected to a wheel cylinder 92 of the front left wheel FL of the vehicle via a front left hold valve 88 (hereinafter called FLHV 88) and a one-way valve 90. The one-way valve 90 is a valve which only lets fluid flow in the direction away from the wheel cylinder 92 and towards the connecting path 86. In addition, the FLHV 88 is a two-position solenoid valve which is normally in the open position. The FLHV 88 is set in the closed status when drive signals are supplied from the ECU 20.

The connecting path 86 is connected to a wheel cylinder 98 of the front right wheel FR of the vehicle via a front right hold valve 94 (hereinafter called FRHV 94) and a one-way valve 96. The one-way valve 96 is a valve which only lets fluid flow in the direction away from the wheel cylinder 98 and towards the connecting path 86. In addition, the FRHV 94 is a two-position solenoid valve which is normally in the open position. The FRHV 94 is set in the closed status when drive signals are supplied from the ECU 20.

The wheel cylinder 92 and wheel cylinder 98 are connected to the connecting pipe 104 via a front left pressure-decrease valve 100 (called FLDV 100) and a front right pressure-decrease valve 102 (called FRDV 102) respectively. The FLDV 100 and the FRDV 102 are two-position solenoid valves which are held in the closed status. The front left pressure-decrease valve 100 and the front right pressure-decrease valve 102 are set in the open status by drive signals supplied from the ECU 20.

The connecting pipe 104 is connected to the reserve tank 38 via a reserve tank cut valve 106 (hereinafter called RVCV 106). The RVCV 106 is a two-position solenoid valve which is held in the closed status. The RVCV 106 is set in the open status by drive signals supplied from the ECU 20.

The rear hydraulic path 74 is connected to a rear hydraulic circuit 112 and the connecting path 114 via a rear cut valve 110 (hereinafter called RCV 110). The RCV 110 is a two-position solenoid valve which is normally in the closed position. The RCV 110 is in the open status when drive signals are supplied from the ECU 20. When the RCV 110 is in the open position, brake fluid is supplied from the rear hydraulic path 74 to the rear hydraulic circuit 112.

The connecting path 114 is connected to a wheel cylinder 120 of the rear left wheel RL of the vehicle via a rear left hold valve 116 (hereinafter called RLHV 116) and a one-way valve 118. The one-way valve 118 is a valve which only lets fluid flow in the direction away from the wheel cylinder 120 and towards the connecting path 114. In addition, the RLHV 116 is a two-position solenoid valve which is normally in the open position. The rear hold valve 116 is set in the closed status when drive signals are supplied from the ECU 20.

The connecting path 114 is connected to a wheel cylinder 126 of the rear right wheel RR of the vehicle via a rear right hold valve 122 (hereinafter called RRHV 122) and a one-way valve 124. The one-way valve 124 is a valve which only lets fluid to flow in the direction away from the wheel cylinder 126 and towards the connecting path 114. In addition, the RRHV 122 is a two-position solenoid valve which is normally in the open position. The rear hold valve 122 is set in the closed status when drive signals are supplied from the ECU 20.

The wheel cylinder 120 and the wheel cylinder 126 are connected to the connecting pipe 104 via a rear left pressure-decrease valve 128 (hereinafter called RLDV 128) and a rear right pressure-decrease valve 130 (hereinafter called RRDV 130) respectively. The RLDV 128 and the RRDV 130 are two-position solenoid valves which are normally in the closed position. The RLDV 128 and the RRDV 130 are set in the open status when drive signals are supplied from the ECU 20.

Figure 2:
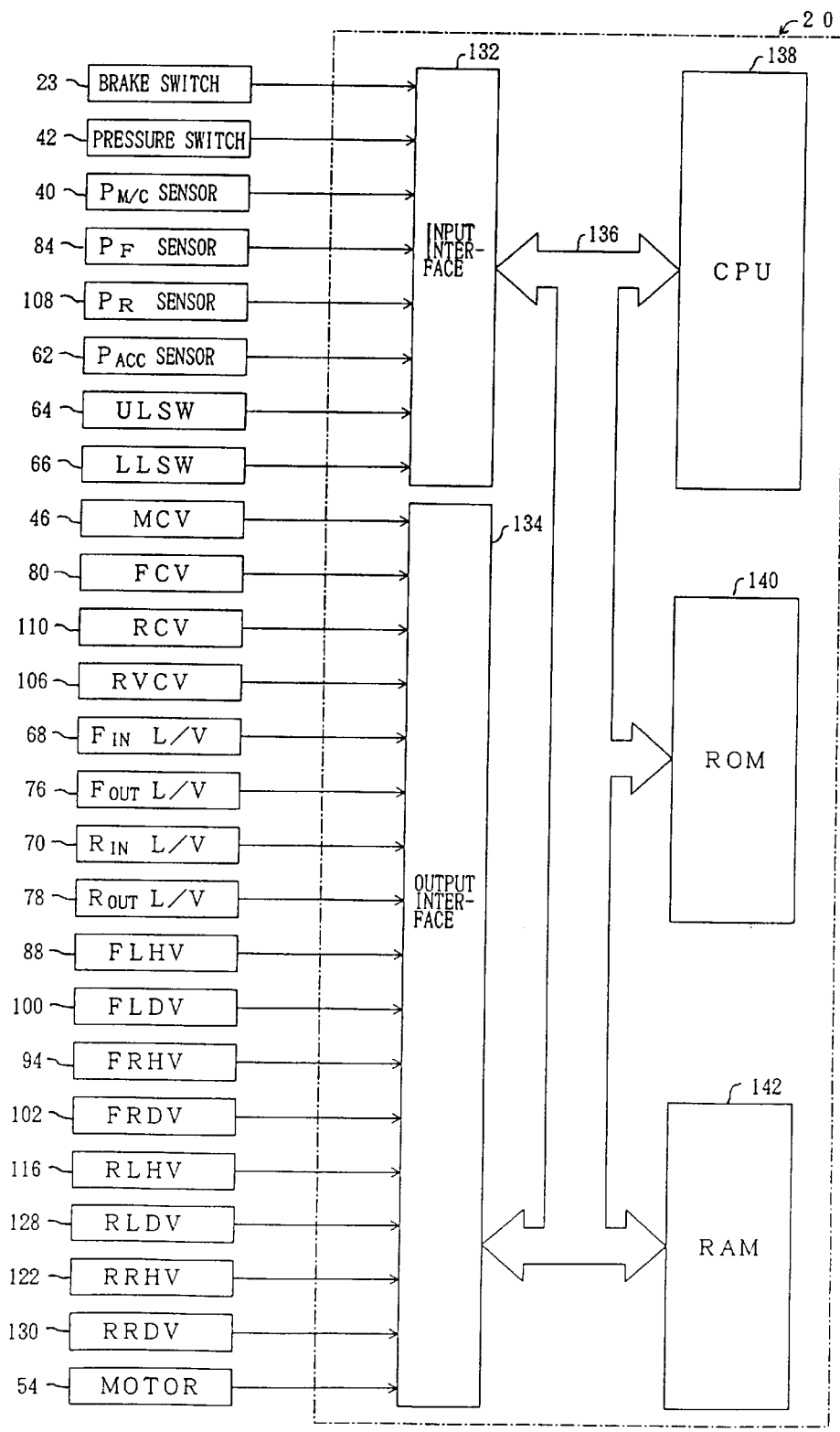
FIG. 2 is a block diagram showing the internal structure of an electronic control unit.

FIG. 2 is a block diagram showing the internal structure of the ECU 20. The ECU 20 is provided with an input interface 132 to which various switches and sensors are connected to comprise the system, and an output interface 134 to which various valves and motors are connected. The input interface 132 and the output interface 134 are connected to a CPU 138, a ROM 140 and a RAM 142 via a shared bus 136. The ROM 140 stores the program which executes the processing to be described later. In the present embodiment, the execution of the program stored in the ROM 140 by the ECU 20 provides the operation which is described below.

The following is a description of the basic operation of the brake fluid pressure control device of the present embodiment. When the brake pedal pressure $F_P$ is applied to the brake pedal 22, the internal pressure of the first hydraulic chamber 32 and second hydraulic chamber 34 of the master cylinder 24 rises. When the internal pressure of the second hydraulic chamber 34 reaches the operating pressure of the pressure switch 42, the pressure switch 42 turns ON and the ECU 20 confirms that the master cylinder pressure $P_{M/C}$ has risen.

When the ECU 20 confirms that the master cylinder pressure $P_{M/C}$ has risen, it closes the MCV 46 and opens the $R_{IN}$ linear valve 70 and the front pressure-decrease valve 100. When this processing is performed, fluid is no longer able to flow out of the master cylinder 24, and the hydraulic pressure that has been adjusted by the $F_{IN}$ linear valve 68 and the $F_{OUT}$ linear valve 76 (hereinafter collectively called the $F_R$ linear valves 68,76) is supplied to the connecting path 86 of the front hydraulic circuit 82 and the hydraulic pressure that has been adjusted by the $R_{IN}$ linear valve 70 and the $R_{OUT}$ linear valve 78 (hereinafter collectively called the $R_R$ linear valves 70,78) is supplied to the connecting path 114 of the front hydraulic circuit 112.

In this status, the $P_{M/C}$ sensor 40 detects the master cylinder pressure $P_{M/C}$ corresponding to the brake pedal pressure $F_P$. In addition, the $P_F$ sensor 84 and $P_R$ sensor 108 respectively detect the brake pressure $P_F$ adjusted by the $F_R$ linear valves 68,76 and the brake pressure $P_R$ adjusted by the $R_R$ linear valves 70,78, respectively. The ECU 20 controls the $F_R$ linear valves 68,76 and the $R_R$ linear valves 70,78 so that the brake pressure $P_F$ detected by the $P_F$ sensor 84 is at a required proportion with respect to the master cylinder pressure $P_{M/C}$ and so that the brake pressure $P_R$ detected by the $P_R$ sensor 108 is at a required proportion with respect to the master cylinder pressure $P_{M/C}$.

When the brake pressure adjusted by the $F_R$ linear valves 68,76 and the $R_R$ linear valves 70,78 is supplied without any control to the wheel cylinder 92, wheel cylinder 98, wheel cylinder 120 and wheel cylinder 126, (hereinafter, called the normal state), the front hold valve 88 and the front hold valve 94 are maintained in the open status and the front pressure-decrease valve 100 and the front pressure-decrease valve 102 are maintained in the closed status. In this situation, the brake pressure $P_F$ that is led to the connecting path 86 of the front hydraulic circuit 82 is supplied to the wheel cylinder 92 and the wheel cylinder 98. In this case, the wheel cylinder pressure $P_{W/C}$ of the wheel cylinder 92 and wheel cylinder 98 is adjusted to be a required multiple of the brake pedal pressure $F_P$.

In the same manner, in the normal status, the rear hold valve 116 and the rear hold valve 122 are held in the open status and the rear pressure-decrease valve 128 and the rear pressure-decrease valve 130 are held in the closed status. Under such a situation, the brake pressure $P_R$ led to the connecting path 114 of the rear hydraulic circuit 112 is supplied to the wheel cylinder 120 and the wheel cylinder 126. In this case, the wheel cylinder pressure $P_{W/C}$ is adjusted so that it is a required multiple of the brake pedal pressure $F_P$.

In this manner, according to the brake fluid pressure control device of the present embodiment, it is possible to adjust the wheel cylinder pressure $P_{W/C}$ of the wheel cylinder 92, wheel cylinder 98, wheel cylinder 120 and wheel cylinder 126 to a pressure corresponding to the brake pedal pressure $F_P$. In the following description, the mode that provides the functions described above is called the normal mode.

In the brake fluid pressure control device of the present embodiment, the $F_R$ linear valves 68,76 and the $R_R$ linear valves 70,78 can supply the connecting path 86 and connecting path 114 with brake fluid at an arbitrary pressure different from that of the master cylinder pressure $P_{M/C}$. Accordingly, with the brake fluid pressure control device of the present embodiment, the wheel cylinder pressure $P_{W/C}$ of the wheel cylinder 92, wheel cylinder 98, wheel cylinder 120 and wheel cylinder 126 can be raised to an arbitrary fluid pressure. In the following description, the mode that provides this function is called the pressure increase mode.

In the brake fluid pressure control device of the present embodiment, it is possible to maintain the wheel cylinder pressure $P_{W/C}$ of the wheel cylinder 92 if the front hold valve 88 is in the closed status and the front pressure-decrease valve 100 is in the closed status. In the same manner, it is possible to hold the wheel cylinder pressure $P_{W/C}$ of the wheel cylinder 98, wheel cylinder 120, and wheel cylinder 126 if the corresponding front hold valve 94, rear hold valve 116 and rear hold valve 122 are in the closed status. In this manner, according to the brake fluid pressure control device of the present embodiment, the wheel cylinder pressure $P_{W/C}$ of the wheel cylinder 92, wheel cylinder 98, wheel cylinder 120 and wheel cylinder 126 can be maintained an arbitrary pressure. In the following description, the mode that provides this function is called the pressure maintain mode.

In the brake fluid pressure control device of the present embodiment, it is possible to reduce the wheel cylinder pressure $P_{W/C}$ of the wheel cylinder 92 if the front hold valve 88 is closed and the front pressure-decrease valve 100 and the RVCV 106 are both open. In the same manner, the wheel cylinder pressure $P_{W/C}$ of the wheel cylinder 98, wheel cylinder 120 and wheel cylinder 126 can be reduced by opening the RVCV 106 and by closing the corresponding close valves front hold valve 94, rear hold valve 116 and rear hold valve 122 and by opening the corresponding front pressure-decrease valve 102, rear pressure-decrease valve 128 and rear pressure-decrease valve 130. In this manner, according to the brake fluid pressure control device of the present embodiment, it is possible to reduce the wheel cylinder pressure $P_{W/C}$ of the wheel cylinder 92, wheel cylinder 98, wheel cylinder 120 and wheel cylinder 126 to an arbitrary pressure. In the following description, the mode that provides this function will be called the pressure-decrease mode.

The ECU 20 uses the operating status of the wheels and the slip ratio for each of the wheels FL, FR, RL and RR to execute the normal mode, pressure-increase mode, maintain mode or pressure-decrease mode described above and as required. With the normal mode it is possible to execute a controlled status corresponding to the driver s intentions. With suitable combinations of the pressure-increase mode, the pressure-maintain mode and the pressure-decrease mode, it is possible to execute favorable brake pressure control which maintains a safe operating status for the automobile.

In passing, if a defect occurs in either the $P_{M/C}$ sensor 40, the $P_F$ sensor 84, the $P_R$ sensor 108 or the piping, then situations may arise where it will not be possible to execute brake pressure control to the same degree as when normal. In cases such as this, for example, when the MCV 46 is in the open status and when the FCV 80 is maintained in the closed status, the master cylinder 24 is the hydraulic pressure source for raising the pressure of the wheel cylinder pressure $P_{W/C}$ of the left and right front wheels FL and FR. In the following discussion, this mode is called the manual mode and according to the system of the present embodiment, it is possible to generate a control force using the manual mode even when there is a defect in the system.

However, when a control force is obtained by the manual mode, the $F_R$ linear valves 68,76 and the $R_R$ linear valves 70,78 are the hydraulic pressure sources for raising the pressure of the wheel cylinder pressure $P_{W/C}$ but the wheel cylinder pressure $P_{W/C}$ is relatively small value when compared to the control force. Because of his, even when there is a malfunction in the system, it is desirable, in so far as possible, for the brake fluid pressure control to be executed using the $F_R$ linear valves 68,76 and the $R_R$ linear valves 70,78 as the hydraulic pressure sources.

In the brake fluid pressure control device of the present embodiment, there is the characteristic that brake fluid pressure control is executed using the $F_R$ linear valves 68,76 and the $R_R$ linear valves 70,78 as the hydraulic pressure sources for as much as possible when there is a malfunction in the system and the portion where the defect has occurred has been detected. The following is a description of the operation of the brake fluid pressure control device according to the present embodiment, with reference to FIG. 3 through FIG. 7.

Figure 3:
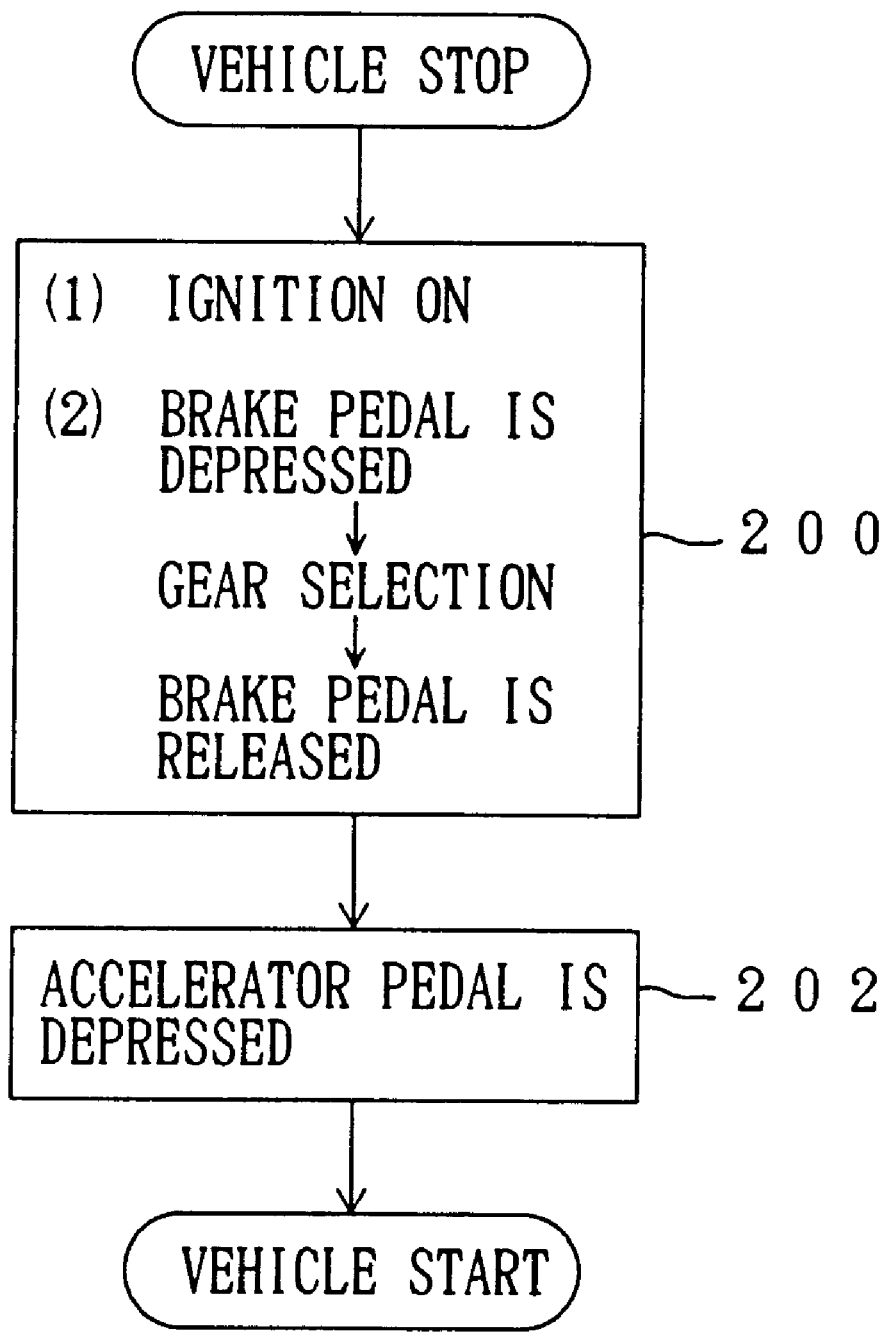
FIG. 3 is a flowchart for explaining an operation which is normally executed when an automotive vehicle is started.

FIG. 3 is a flowchart for explaining an operation which is normally executed when an automotive vehicle is started. As shown in FIG. 3, during the time until a stationary automotive vehicle begins to move, there is (1) processing to start the engine once the ignition switch has been switched on, (2) selection of the gear once the brake pedal has been depressed and then the execution for canceling (step 200) the force of the brake being depressed [i.e. the operator's foot is removed]. It is possible for the automobile to move once this has been done and the accelerator is depressed (step 202).

Figure 4:
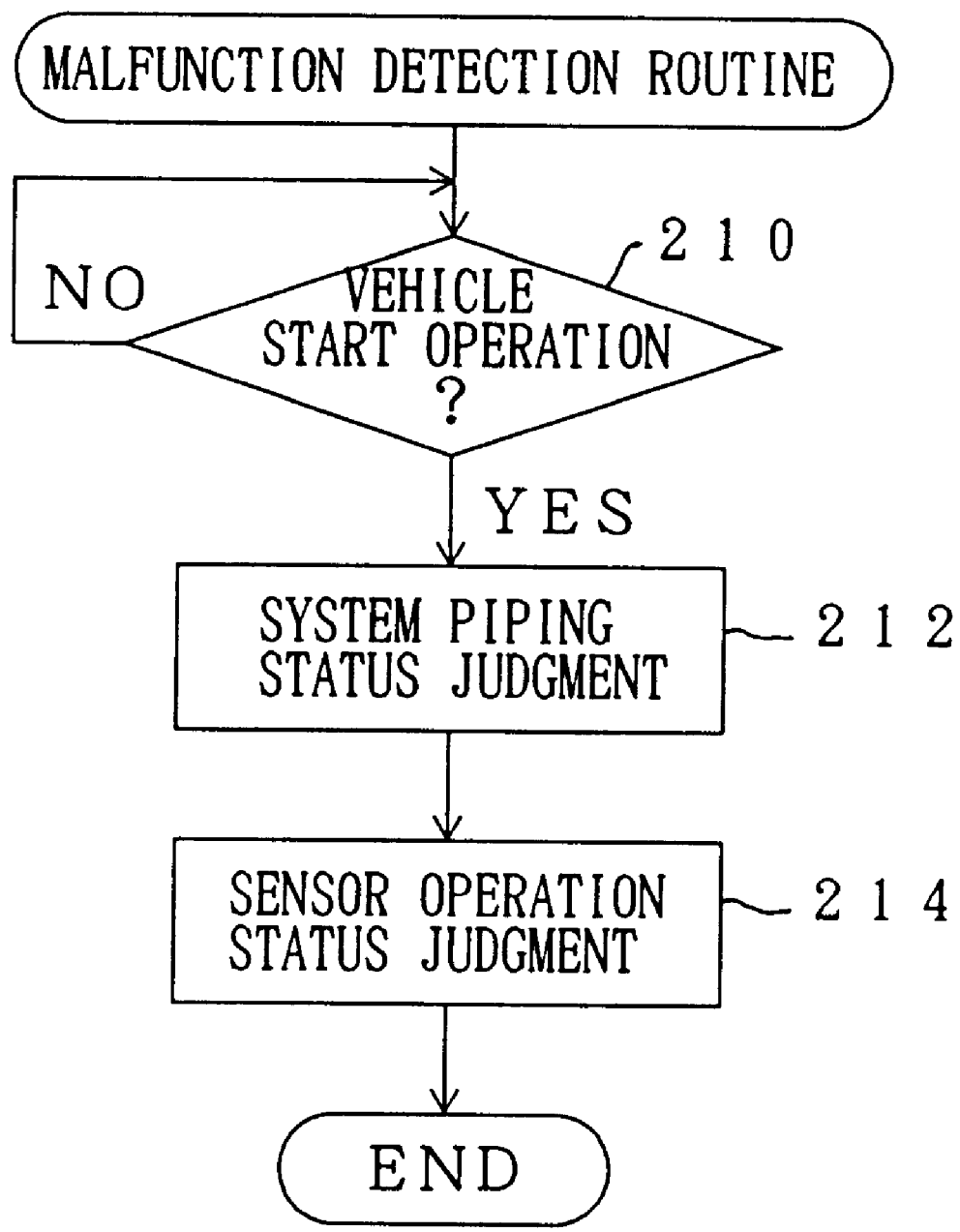
FIG. 4 is a flowchart for explaining one embodiment of a malfunction detection routine executed in the brake fluid pressure control device of FIG. 1.

As described above, the brake pedal is depressed until a stationary automobile begins to move. The ECU 20 executes processing to detect whether or not there is a malfunction in the system during this time while the brake pedal is depressed. FIG. 4 is a flowchart for explaining a malfunction detection routine executed by the ECU 20 in order to detect a malfunction in the system.

As shown in FIG. 4, in step 210, the ECU 20 determines whether or not there has been an operation to start the stationary automotive vehicle. Specifically, it determines whether or not the ignition switch has been turned on and the brake pedal depressed. If it determines that there has been the operation to start the vehicle, then the processing moves to step 212.

In step 212, processing is performed to check the system piping or conduits. In the system piping status determination routine, execution is performed for the processing necessary to determine whether or not there is a malfunction in the $F_R$ linear valves 68,76, the $R_R$ linear valves 70,78, the front hydraulic circuit 82, the rear hydraulic circuit 112 and the connecting pipe 104. The routine of step 212 will be described later in detail. When the processing of step 212 is completed, the routine proceeds to the next step 214.

In step 214, a check is made of the sensors provided in the system. In this sensor operation status determination routine, the processing necessary to determine whether or not there is a malfunction in the $P_{M/C}$ sensor 40, the $P_F$ sensor 84 and the $P_R$ sensor 108 is executed. The routine of step 214 will be described later in detail. The malfunction detection routine is completed once this processing ends.

FIG. 5 is a time chart for explaining the processing of step 212 described above. In the present embodiment, the check of the system piping status is carried out by continuously executing Modes 1 through 18 shown in FIG. 5, and monitoring the detection value for the $P_F$ sensor 84 and the detection value for the $P_R$ sensor 108 each time there is a change of mode.

Prior to the commencement of the piping check, all of the valves in the system are kept in the OFF status. In this case, the status is as shown in FIG. 1 for the brake fluid pressure control device and Mode 1 is executed when the $R_{IN}$ linear valve 70 changes to the ON status (fully open). In Mode 1, the accumulator pressure $P_{ACC}$ is supplied to the rear hydraulic path 74. The ECU 20 determines that the $R_{IN}$ linear valve 70 is normal if the detection value for the $P_R$ sensor 108 rises suddenly when Mode 1 is executed.

Once Mode 1 has been executed, the $R_{IN}$ linear valve 70 is switched to the OFF status (fully closed) and the RCV 110 is switched to the ON status (fully open), and the rear hold valve 116 and the rear hold valve 122 are both switched to the ON status (fully closed) to execute Mode 2. When Mode 2 is executed, the fluid pressure which is supplied to the rear hydraulic path 74 reaches the rear hold valve 116 and the rear hold valve 122. The ECU 20 determines that the RCV 110 and the rear hold valve 116 and rear hold valve 122 are normal if the detection value of the $P_R$ sensor 108 drops slightly with the execution of Mode 2.

After Mode 2 has been executed, the rear hold valve 116 is placed in the OFF status (fully open) and Mode 3 is executed. When Mode 3 is executed, the accumulator pressure $P_{ACC}$ flows into the wheel cylinder 120. The ECU 20 determines that there are no leaks in the wheel cylinder 120 if there is only a slight reduction (i.e. no sudden drop) in the detection value for the $P_R$ sensor 108 accompanying the execution of Mode 3.

After Mode 3 has been executed, the rear hold valve 122 is placed in the OFF status (open) and Mode 4 is executed. When Mode 4 is executed, the accumulator pressure $P_{ACC}$ flows to the wheel cylinder 126. The ECU 20 determines that there is no leak in the wheel cylinder 126 is there is only a small drop (i.e. not a large and sudden drop) in the detection value for the $P_R$ sensor 108 when Mode 4 is executed.

After Mode 4 has been executed, the MCV 46 is placed in the ON status (closed), the $F_{IN}$ linear valve 68 is placed in the ON status (open), the RCV 110 is placed in the OFF status (closed) and the front hold valve 88 and front hold valve 94 are placed in the ON status to execute Mode 5.

After Mode 5 has been executed, the $F_{IN}$ linear valve 68 is placed in the OFF status (fully closed) and the FCV 80 is placed in the ON status (open) to execute Mode 6. When Mode 6 is executed, the accumulator pressure $P_{ACC}$ flows into the connecting path 86. The ECU 20 determines that the FCV 80 is operating normally when the detection value for the $P_F$ sensor 84 increases suddenly when Mode 6 is executed.

After the execution of Mode 6, Mode 7 is executed when the front hold valve 88 is switched to the OFF status (closed). When Mode 7 is executed, the accumulator pressure $P_{ACC}$ flows into the wheel cylinder 92. The ECU 20 determines that there is not a leak in the wheel cylinder 92 if there is only a small reduction (i.e. there is no sudden drop) in the detection value for the $P_F$ sensor 84 accompanying the execution of Mode 7.

After the execution of Mode 7, the front hold valve 94 is switched to the OFF status (closed status) to execute Mode 8. When Mode 8 is executed, the accumulator pressure $P_{ACC}$ flows into the wheel cylinder 98. The ECU 20 determines that there is no leak in the wheel cylinder 98 if there is only a slight drop (i.e. not a sudden drop) for the detection value of the $P_F$ sensor 84.

After the execution of Mode 8, the MCV 46 is placed in the OFF status (open status), the $R_{OUT}$ linear valve 78 is placed in the ON status (fully open status), the FCV 80 is placed in the OFF status (closed status) and the RCV 110 is placed in the ON status (open status) to execute Mode 9. When Mode 9 is executed, the wheel cylinder 92 and wheel cylinder 98 of the left and right front wheels FL and FR are separated from the $F_{IN}$ linear valve 68 and connected to the master cylinder 24 and the hydraulic pressure that is stored in the wheel cylinder 120 and the wheel cylinder 126 for the left and right rear wheels RL and RR is released into the reserve tank 38. The ECU 20 determines that the $R_{OUT}$ linear valve 78 is operating normally if there is no sudden decrease for the detection value of the $P_R$ sensor 108 when Mode 9 is executed.

After the execution of Mode 9, $R_{IN}$ linear valve 70 is placed in the ON status (fully open) and $R_{OUT}$ linear valve 78 is placed in the OFF status (closed status) to execute Mode 10. When Mode 10 is executed, the accumulator pressure $P_{ACC}$ is supplied to the wheel cylinder 120 and wheel cylinder 126 of the rear wheels RL and RR. Mode 10 is to replenish the hydraulic pressure to the wheel cylinder 120 and the wheel cylinder 126.

After the execution of Mode 10, the $R_{IN}$ linear valve 70 is placed in the OFF status (closed status), the rear pressure-decrease valve 128 of the left rear wheel RL is placed in the ON status (open status) and the rear hold valve 122 of the right rear wheel is placed in the ON status (closed status) so that Mode 11 is executed. When Mode 11 is executed, the pressure that is stored in the rear hydraulic path 74, connecting path 114 and the wheel cylinder 120 of the left rear wheel RL flows into the connecting pipe 104. The ECU 20 determines that there is no leak in the connecting pipe 104 if there is only a small reduction (i.e. not a sudden one) for the detection value of the $P_R$ sensor 108 when Mode 11 is executed.

After the execution of Mode 11, the RVCV 106 is placed in the ON status (open status) to execute Mode 12. When Mode 12 is executed, the hydraulic pressure that is stored in the rear hydraulic path 74, connecting path 114, the wheel cylinder 120 of the left rear wheel RL and the connecting pipe 104 is released to the reserve tank 38. The ECU 20 determines that the rear pressure-decrease valve 128 and the RVCV 106 are operating normally if there is a sudden decrease in the detection value for the $P_R$ sensor 108 accompanying the execution of Mode 12.

After the execution of Mode 12, the $R_{IN}$ linear valve 70 is placed in the ON status (fully open status), the rear pressure-decrease valve 128 is placed in the OFF status (closed status), the rear hold valve 122 is placed in the OFF status (open status) and the RVCV 106 is placed inn the OFF status (closed status)) to execute Mode 13. When Mode 13 is executed, the accumulator pressure $P_{ACC}$ is supplied to the wheel cylinder 120 and the wheel cylinder 126 of the rear wheels RL and RR.

After the execution of Mode 13, the $R_{IN}$ linear valve 70 is placed in the OFF status (closed status), the rear hold valve 116 of the left rear wheel RL is placed in the ON status (closed status), the rear pressure-decrease valve 130 for the right rear wheel RR is placed in the ON status (open status) and the RVCV 106 is placed in the ON status (open status) to execute Mode 14. When Mode 14 is executed, the hydraulic pressure that is stored in the rear hydraulic path 74, connecting path 114 and the wheel cylinder 126 of the right rear wheel RR is released to the reserve tank 38. The ECU 20 determines that the rear pressure-decrease valve 130 is operating normally if there is a sudden drop in the detection value for the $P_R$ sensor 108 when there is the execution of Mode 14.

After the execution of Mode 14, the MCV 46 is placed in the ON status (closed status), the $F_{OUT}$ linear valve 76 is placed in the ON status (open status), the RCV 110 is placed in the OFF status (closed status), the rear hold valve 116 is placed in the OFF status (open status), the rear pressure-decrease valve 130 is placed in the OFF status (closed status) and the RVCV 106 is placed in the OFF status (closed status) to execute Mode 15. When Mode 15 is executed, the master cylinder pressure $P_{M/C}$ is supplied to the wheel cylinder 92 and wheel cylinder 98 of the left and right front wheels FL and FR. In addition, when Mode 15 is executed, the wheel cylinder 92 and wheel cylinder 98 are connected to the reserve tank 38 via the $F_{OUT}$ linear valve 76. The ECU 20 determines that the $F_{OUT}$ linear valve 76 is operating normally if there is a sudden drop for the detection value of the $P_F$ sensor 84 accompanying the execution of Mode 15.

After the execution of Mode 15, the $F_{IN}$ linear valve 68 is placed in the ON status (open status), $F_{OUT}$ linear valve 76 is placed in the OFF status (closed status), FCV 80 is placed in the ON status (open status) and RCV 110 is placed in the OFF status (open status) to execute Mode 16. When Mode 16 is executed, the accumulator pressure $P_{ACC}$ flows to the wheel cylinder 92 and the wheel cylinder 98 of the front wheels FL and FR. Mode 16 decreases the pressure of the hydraulic fluid acting to the $P_R$ sensor 108 to atmospheric pressure and is for replenishing the hydraulic pressure to the wheel cylinder 92 and the wheel cylinder 98.

After the execution of Mode 16, the $F_{IN}$ linear valve 68 is placed in the OFF status (closed status), FCV 80 is placed in the OFF status (closed status), the front pressure-decrease valve 100 of the left front wheel FL is placed in the ON status (open status) and the front hold valve 94 of the right front wheel FR is placed in the ON status (closed status) to execute Mode 17. When Mode 17 is executed, the hydraulic pressure that is stored in the connecting path 86 and the wheel cylinder 92 flows into the connecting pipe 104. The ECU 20 determines that the front pressure-decrease valve 100 is functioning normally if there is a slight reduction in the detection value for the $P_F$ sensor 84 when Mode 17 is executed.

After Mode 17 has been executed, the front hold valve 88 of the left front wheel FL is placed in the ON status (closed status), the front pressure-decrease valve 100 of the left front wheel FL is placed in the OFF status (closed status), the front hold valve 94 of the right front wheel FR is placed in the OFF status (open status), the front pressure-decrease valve 102 of the right front wheel FR is placed in the ON status (open status) and the RVCV 106 is placed in the ON status (open status) to execute Mode 18. When Mode 18 is executed, the hydraulic pressure which is stored in the connecting path 86, wheel cylinder 98 and the connecting pipe 104 is released to the reserve tank 38. The ECU 20 determines that the front pressure-decrease valve 102 is operating normally when there is a sudden drop in the detection value for the $P_F$ sensor 84 accompanying the execution of Mode 18.

The ECU 20 executes a check for the system piping status by continuously executing Modes 1 through 18, and if a malfunction is recognized in any portion, a malfunction flag is set to "1" for that portion. Accordingly, once the processing for the piping check has been executed, it is possible to use the status for the malfunction flags to determine the location of the malfunction. Once this processing has been completed, all of the valves are placed in the OFF status, and the status again returns to that shown in FIG. 1.

Figure 6:
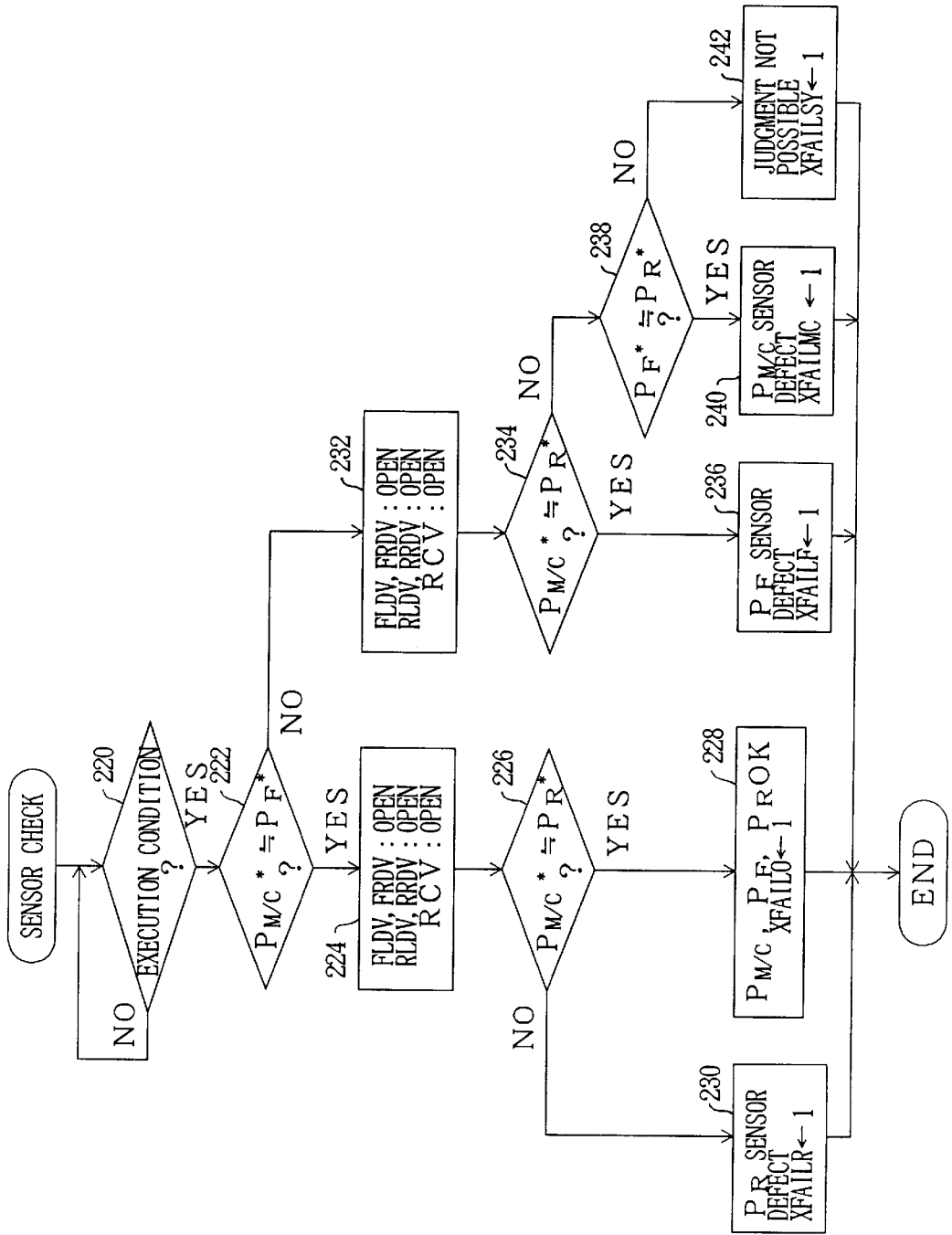
FIG. 6 is a flowchart for explaining a first embodiment of a sensor operation status determination routine executed by the brake fluid pressure control device shown in FIG. 1.

FIG. 6 is a flowchart for explaining a first embodiment of the sensor operation status determination routine specifically describing the processing of step 214 described above. When this routine starts, the processing of step 220 is first executed. In step 220, there is first a determination of whether or not the necessary conditions for the execution of this routine (hereinafter called the determination condition) have been established. In this embodiment, these conditions are (1) that drift compensation for the $P_{M/C}$ sensor 40, $P_F$ sensor 84 and $P_R$ sensor 108 has been completed, (2) that the $P_{ACC}$ sensor 62 be detecting a suitable pressure, (3) that the output from the brake switch 23 is ON, (4) that the $P_{M/C}$ sensor 40 be detecting a suitable pressure and (5) that the output from the pressure switch 42 is ON. If it is determined that these determination conditions are established, then the processing of the following step, step 222 is executed.

In step 222, there is a determination of whether or not the detection value for the $P_{M/C}$ sensor 40 (hereinafter called signal $P_{M/C}*$) and the detection value for the $P_F$ sensor 84 (hereinafter called signal $P_F*$), are approximately the same values. The processing of step 222 is executed on the condition that all of the valves are in the off status. In this case, the hydraulic pressure that acts upon the $P_F$ sensor 84 is effectively the same pressure as that which acts upon the $P_{M/C}$ sensor 40. Accordingly, if the $P_{M/C}$ sensor 40 and the $P_F$ sensor 84 are normal, then the signal $P_{M/C}*$ and the signal $P_F*$ will be at the same value. In this step 222, if it is determined that the signal $P_{M/C}*$ and the signal $P_F*$ are at the same value, then it is determined that $P_{M/C}$ sensor 40 and $P_F$ sensor 84 are both operating normally and the processing of the following step, step 224 is executed.

In step 224, the front pressure-decrease valve 100, front pressure-decrease valve 102 and the rear pressure-decrease valve 128 and rear pressure-decrease valve 130 are all placed in the open status and the processing to place the RCV 110 in the open status is executed. When this processing is finished, the processing of the following step, step 226 is executed.

In step 226, there is a determination of whether or not the detection value for the $P_R$ sensor 108 (hereinafter expressed as signal $P_R*$) and the detection value $P_{M/C}*$ for the $P_{M/C}$ sensor 40 are effectively the same value. When the processing of the step 224 is executed, the hydraulic pressure generated by the master cylinder 24 not only flows to the front hydraulic circuit 82, but also flows to the rear hydraulic circuit 112 via the connecting pipe 104 and to the rear hydraulic path 74 to which the $P_R$ sensor 108 s connected. Accordingly, when this step 226 is executed, then the detection value $P_R*$ and the detection value $P_{M/C}*$ should be approximately the same value if the $P_R$ sensor 108 is functioning normally. In other words, if it is determined that the detection value $P_R*$ and the detection value $P_{M/C}*$ are effectively the same value, then it is possible to conclude that the $P_R$ sensor 108 is not malfunctioning. If this is the case, then the processing of the following step, step 228 is executed. However, if it is determined that the detection value $P_R*$ and the detection value $P_{M/C}*$ are not effectively the same value, then it is determined that the detection value $P_R*$ of the $P_R$ sensor 108 is an abnormal value and the processing shifts to the execution of step 230.

In step 228, "1" is set in flag XFAIL0. As described above, the processing of this step 228 is executed only when it is confirmed that the $P_{M/C}$ sensor 40, $P_F$ sensor 84 and the $P_R$ sensor 108 are all normal. Accordingly, in the system of the present embodiment, if "1" is set in XFAIL0 then it can be determined that all of the sensors are functioning normally. This routine ends when the processing of step 228 is complete.

In step 230, "1" is set in flag XFAILR. As described above, the processing of this step 230, is executed only in the case when it is recognized that the $P_{M/C}$ sensor 40 and the $P_F$ sensor 84 are operating normally and that the detection value $P_R*$ for the $P_R$ sensor 108 is an abnormal value. Accordingly, in the system of the present embodiment, if "1" is set in flag XFAILR, then it can be concluded that the $P_{M/C}$ sensor 40 and the $P_F$ sensor 84 are functioning normally. This routine ends when the processing of step 230 is finished.

In the above step 222, if it is determined that the detection value $P_{M/C}*$ and the detection value $P_F*$ are not effectively the same value, then it is possible to determine that either the detection value $P_R*$ or the detection value $P_F*$ is an abnormal value. If this is the case then the processing of step 232 is executed.

In step 232, the processing is executed as it was for step 224 above with the front pressure-decrease valve 100 and front pressure-decrease valve 102, the rear pressure-decrease valve 128 and the rear pressure-decrease valve 130 and the RCV 110 in the open status. When this processing is executed, the same pressure as the master cylinder pressure $P_{M/C}$ acts on the $P_R$ sensor 108 as well as the $P_F$ sensor 84. The processing of step 234 is executed when this processing is completed.

In step 234, there is a determination of whether the detection value $P_R*$ of the $P_R$ sensor 108 and the detection value $P_{M/C}*$ of the $P_{M/C}$ sensor 40 are effectively the same value or not. If as a result it is determined that the two are effectively equal, then it is determined that the $P_{M/C}$ sensor 40 and the $P_R$ sensor 108 are both operating normally and that it is the detection value $P_F*$ of the $P_F$ sensor 84 which is the abnormal value. If this is the case then the processing of step 236 is executed.

In step 236, "1" is set in the flag XFAILF. As described above, the processing of step 236 is executed only when the $P_{M/C}$ sensor 40 and the $P_R$ sensor 108 are functioning normally and when it is recognized that the detection value $P_F*$ of the $P_F$ sensor 84 is an abnormal value. Accordingly, in the system of the present embodiment, if "1" is set in the flag XFAILF, then it can be concluded that the $P_{M/C}$ sensor 40 and the $P_R$ sensor 108 are functioning normally. This routine ends when the processing of step 236 is finished.

In the step 234 above, if it is determined that the detection value $P_{M/C}*$ and the detection value $P_R*$ are not effectively the same value, then it is possible to conclude that either the detection value $P_{M/C}*$ or the detection value $P_R*$ is an abnormal value. In this case, the processing of step 238 is executed.

In step 238, there is a determination of whether or not the detection value $P_F*$ of the $P_F$ sensor 84 and the detection value $P_R*$ of the $P_R$ sensor 108 are effectively the same value. If as a result it is determined that they are effectively the same value, then it is determined that the $P_F$ sensor 84 and the $P_R$ sensor 108 are functioning normally and that the detection value $P_{M/C}*$ of the $P_{M/C}$ sensor 40 is an abnormal value. In this case, the processing of step 240 is executed.

In step 240, "1" is set in the flag XFAILMC. As described above, the processing of step 240 is executed only in the case when the $P_F$ sensor 84 and the $P_R$ sensor 108 are functioning normally and it has been determined that the detection value $P_{M/C}*$ is an abnormal value. Accordingly, in the system of the present embodiment, if "1" is set in the flag XFAILMC, then it is possible to determine that at least the $P_F$ sensor 84 and the $P_R$ sensor 108 are functioning normally. This routine ends when the processing of step 228 has been executed.

In step 238, if it is determined that the detection value $P_F*$ and the detection value $P_R*$ are not effectively the same value, then it is possible to determine that different values have been detected for the $P_{M/C}$ sensor 40, the $P_F$ sensor 84 and the $P_R$ sensor 108. In this case, it is not possible to determine the location of the malfunction and the processing of step 242 is executed.

In step 242, "1" is set in the flag XFAILSY. As described above, the processing of step 242 is executed only when it is not possible to determine the system malfunction. Accordingly, in the system of the present embodiment, if "1" is set in the flag XFAILSY, then it is possible that not one of the detection values for any of the sensors can be regarded as being normal. This routine ends when the processing of step 242 is finished.

According to the processing described above, it is possible to set a flag corresponding to whether or not the $P_{M/C}$ sensor 40, the $P_F$ sensor 84 and the $P_R$ sensor 108 are operating normally. In addition, according to the processing described above, it is possible to execute a sensor check using the master cylinder 24 as the hydraulic pressure source. Because of this, with the brake fluid pressure control device of the present embodiment, it is not necessary to operate the motor 54 or the like to perform a sensor check, and it is possible to check the sensors by generating little noise.

Figure 7:
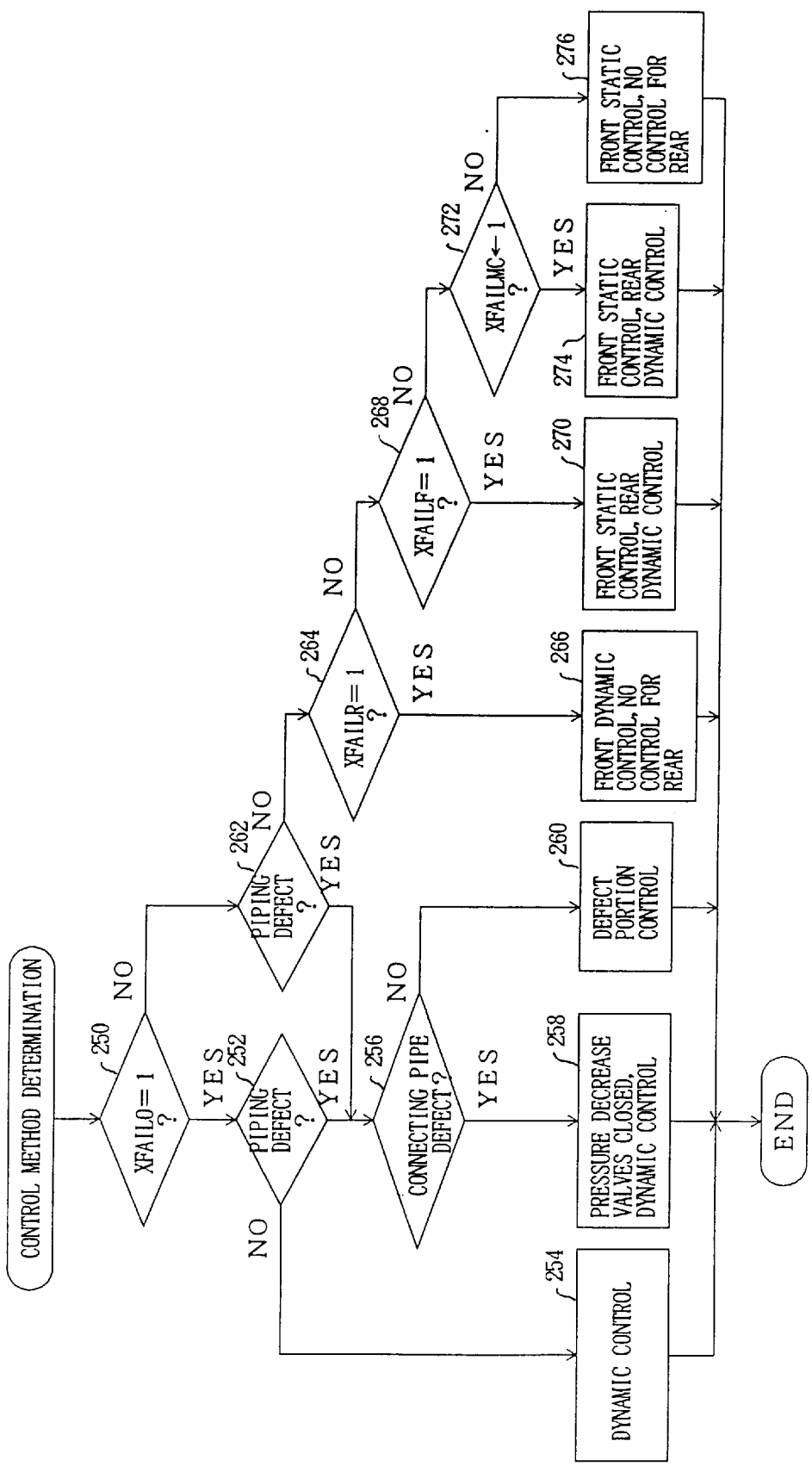
FIG. 7 is a flowchart for explaining a control method determination routine executed by the brake fluid pressure control device shown in FIG. 1.

The ECU 20 selects the method of brake fluid pressure control in accordance with the results of the piping check and the sensor check described above. FIG. 7 is a flowchart showing one example of a routine executed by the ECU 20 for selecting the method of brake fluid pressure control.

The processing of step 250 is executed when the routine of FIG. 7 is started.

In step 250, there is a determination of whether or not "1" is set in the flag XFAILO. In other words, there is a determination made for whether or not the $P_{M/C}$ sensor 40, $P_F$ sensor 84 and the $P_R$ sensor 108 are all functioning normally. If as a result, it is determined that flag XFAILO=1 then the processing of the following step 252 is executed.

In step 252, there is a determination of whether or not any malfunction has been detected as a result of the piping check. If it is determined that any malfunction has not been detected, then it is determined that the system is normal and the processing of the following step 254 is executed.

In step 254, the method of brake fluid pressure control of the front hydraulic circuit 82 is determined by control using the $F_{IN}$ linear valve 68 and the $F_{OUT}$ linear valve 76 as the hydraulic pressure source, and the method of brake fluid pressure control of the rear hydraulic circuit 112 is determined by control using the $R_{IN}$ linear valve 70 and the $R_{OUT}$ linear valve 78 as the hydraulic pressure source. This routine ends when this processing ends. Moreover, in the following description, a control that uses the $F_{IN}$ linear valve 68 and $F_{OUT}$ linear valve 76, and the $R_{IN}$ linear valve 70 and $R_{OUT}$ linear valve 78 as the hydraulic pressure source is called dynamic control, while a control that uses the master cylinder 24 as the hydraulic pressure source is called static control.

In the step 252, if it is determined as a result of the piping check that there is a piping malfunction, then the processing of step 256 is executed. In step 256, there is a determination of whether or not the malfunction in the piping is a malfunction for the connecting pipe 104, that is, a determination of whether or not Mode 11 indicated by FIG. 5 has been executed for abnormal piping. If as a result of this it is determined that there is a malfunction in the connecting pipe 104 then the processing of the following step 258 is executed.

In step 258, the front pressure-decrease valve 100, front pressure-decrease valve 102, rear pressure-decrease valve 128 and rear pressure-decrease valve 130 are inhibited from opening and the method whereby there is brake fluid pressure control of the front hydraulic circuit 82 and the method whereby there is brake fluid pressure control for the rear hydraulic circuit 112 are both determined by dynamic control. If the system malfunction is in the connecting pipe 104, then closing the front pressure-decrease valve 100, front pressure-decrease valve 102, rear pressure-decrease valve 128 and rear pressure-decrease valve 130 will isolate the location of that malfunction from the system. Accordingly, with the processing of step 258, it is possible to execute dynamic control in the same manner as when there was not a malfunction, and irrespective of there being a malfunction in the connecting pipe 104. This routine ends when the processing of this step is finished.

In step 256, if it is determined that the piping malfunction is not a malfunction in the connecting pipe 104, then the processing of the following step 260 is executed. In step 260, processing is executed to provide a failsafe monitor in accordance with the portion for which a malfunction has been recognized. This routine ends when the processing of this step is finished.

In the step 250, if it has been determined that flag XFAILO=1 has not been established, then the processing of the step 262 is executed. In step 262, there is a determination of whether or not any abnormalities have been recognized as a result of a piping check the same as for step 252 above. If "1" is not set in flag XFAILO then it can be determined that some malfunction has been identified as a result of the sensor check. In the present embodiment, if there is a malfunction in the piping, then there could be occasions when this manifests itself as a malfunction in a sensor during a sensor check. Accordingly, if a malfunction is recognized during a sensor check, then if there is a malfunction in the piping check as well, then there is the possibility that the sensors $P_{M/C}$ sensor 40, $P_F$ sensor 84 and $P_R$ sensor 108 are functioning normally.

Because of this possibility, this routine executes the processing of step 256 when it has been determined in step 262 that there is a malfunction in the piping. As a result, the processing of step 258 is executed when it is recognized that the malfunction in the piping is a malfunction of the connecting pipe 104, and the processing of step 258 is executed. In addition, if it has been determined that the malfunction of the piping was not a malfunction of the connecting pipe 104, then the failsafe processing of step 260 is executed in accordance with the fail status.

In step 262, if it has been determined that there is not a malfunction in the piping, then it can be concluded that there is a malfunction in at least one of the $P_{M/C}$ sensor 40, the $P_F$ sensor 84 and the $P_R$ sensor 108. In this case, the processing of step 264 is executed.

In step 264, there is a determination of whether or not "1" is set in the flag XFAILR. If flag XFAILR=1, then the $P_{M/C}$ sensor 40 and the $P_F$ sensor 84 are normal and it can be determined that the detection value $P_R^*$ of the P sensor 108 is an abnormal value. In this case, the processing of step 266 is executed.

In step 266, the method of brake fluid pressure control of the front hydraulic circuit 82 is determined as a dynamic control and that there will be no brake fluid pressure control for the rear hydraulic circuit 112. According to this processing it is possible to generate a high pressure wheel cylinder pressure $P_{W/C}$ in the wheel cylinder 92 and the wheel cylinder 98 of the left and right front wheels, and to prevent the execution of unsuitable brake fluid pressure control for the rear hydraulic circuit 112 because of the abnormal value for the detection value $P_R^*$. This routine ends when the processing of step 266 is finished.

In step 264, the processing of step 268 was executed when it was determined that the flag XFAILR=1 was not established. In step 268, there is a determination of whether or not "1" is set in the flag XFAILF. If the flag XFAILF=1 is established, then the $P_{M/C}$ sensor 40 and the $P_R$ sensor 108 are normal and it can be determined that the detection value $P_F^*$ for the $P_F$ sensor 84 is an abnormal value. In this case, the processing of step 270 is executed.

Step 270 provides a static control as the method of brake fluid pressure control for the front hydraulic circuit 82, and a dynamic control on the basis of the detection value $P_{M/C}^*$ for the $P_{M/C}$ sensor 40 shall be used as the method of brake fluid pressure control for the rear hydraulic circuit 112. According to this processing, it is possible to generate a high pressure wheel cylinder pressure $P_{W/C}$ for the rear pressure-decrease valve 128 and the rear pressure-decrease valve 130 for the left and right rear wheels and to be able to prevent the execution of unsuitable brake fluid pressure control for the front hydraulic circuit 82 due to the abnormal value for the detection value $P_F^*$. This routine ends when the processing of this step is finished.

In step 268, if it has been determined that flag XFAILF=1 has not been established, then the processing of step 272 is executed. In step 272, there is a determination of whether or not "1" is set in flag XFAILMC. If flag XFAILMC is established, then $P_F$ sensor 84 and $P_R$ sensor 108 are normal and it can be determined that there is an abnormal value for the detection value $P_{M/C}^*$ for the $P_{M/C}$ sensor 40. In this case, the processing of step 274 is executed.

In step 274, a static control is provided as the method of brake fluid pressure control for the front hydraulic circuit 82 and a dynamic control based on the detection value $P_F^*$ will be the method of brake fluid pressure control for the rear hydraulic circuit 112. According to this processing, it is possible to generate a high pressure for the wheel cylinder pressure $P_{W/C}$ to the left and right rear wheels RL and RR and for it to be possible to prevent the execution of unsuitable brake fluid pressure control to the front hydraulic circuit 82 due to the abnormal value for the detection value $P_{M/C}^*$. This routine ends when the processing of this step is finished.

If in step 272 it is determined that flag XFAILMC=1 is not established, then it is possible to determine that there is a malfunction which cannot be determined (a malfunction where "1" is set for the flag XFAILSY) in the sensors provided to the brake fluid pressure control device. In this case, the processing of step 276 is executed. In step 276, static control is determined as the method of brake fluid pressure control for the front hydraulic circuit 82 and it is determined that there will be no brake fluid pressure control for the rear hydraulic circuit 112. In this processing, the master cylinder pressure $P_{M/C}$ is directed to the wheel cylinder 92 and the wheel cylinder 98 for the left and right front wheels and it is possible to prevent the execution of an unsuitable brake fluid pressure control for the rear hydraulic circuit 112. This routine ends when the processing of step 276 is finished.

As described above, according to the brake fluid pressure control device of the present embodiment, there is provided a function for identifying the location where a malfunction has occurred and to execute brake fluid pressure control using a method corresponding to the location where the malfunction exists. Because of this, it is possible for the brake fluid pressure control device of the present embodiment to enable superior braking performance when compared to devices which stop dynamic pressure control when some sort of malfunction occurs in the system.

Figure 8A:
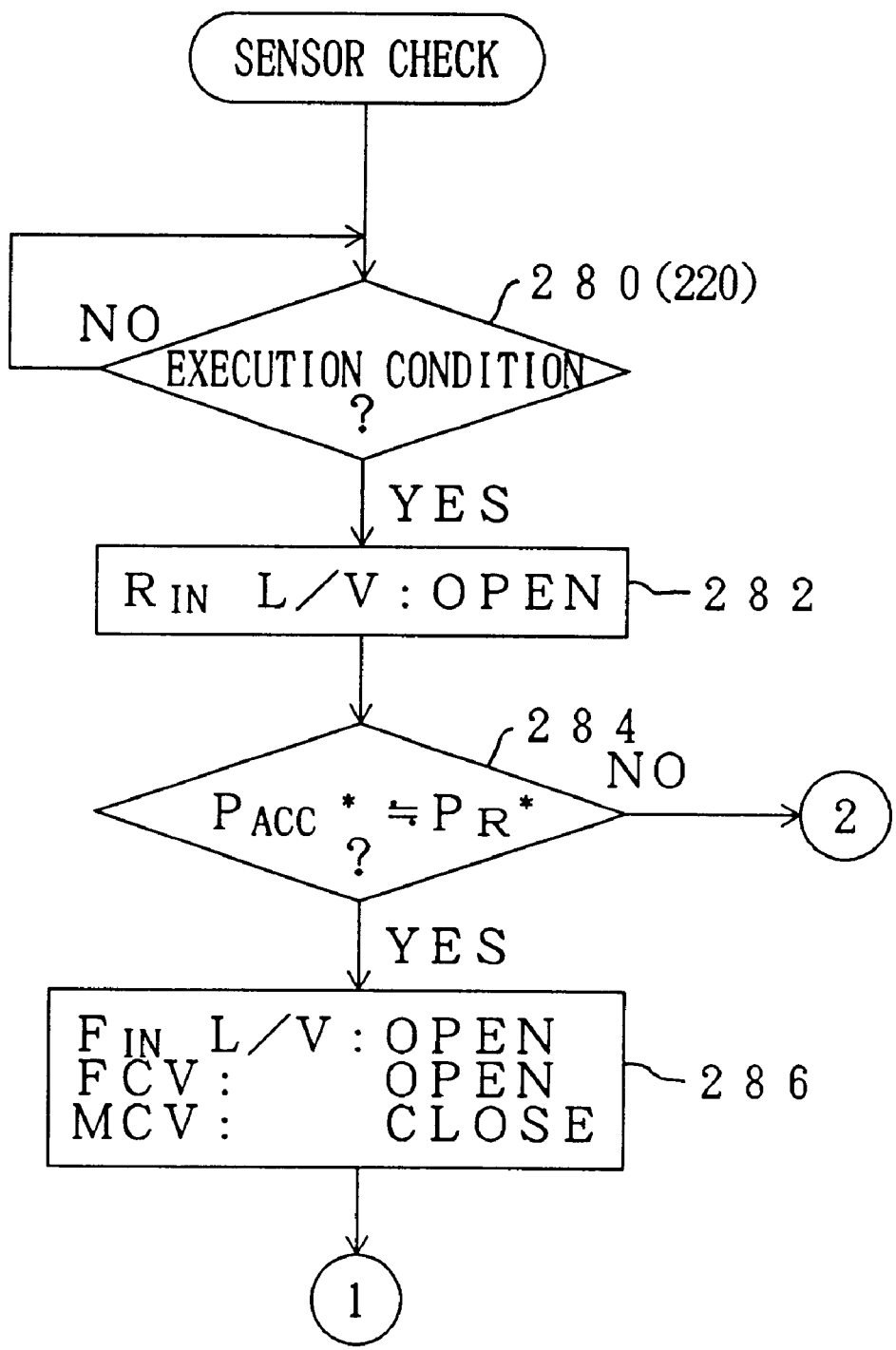
FIG. 8A, FIG. 8B and FIG. 8C are flowcharts for explaining a second embodiment of the sensor operation status determination routine executed by the brake fluid pressure control device shown in FIG. 1.
Figure 8B:
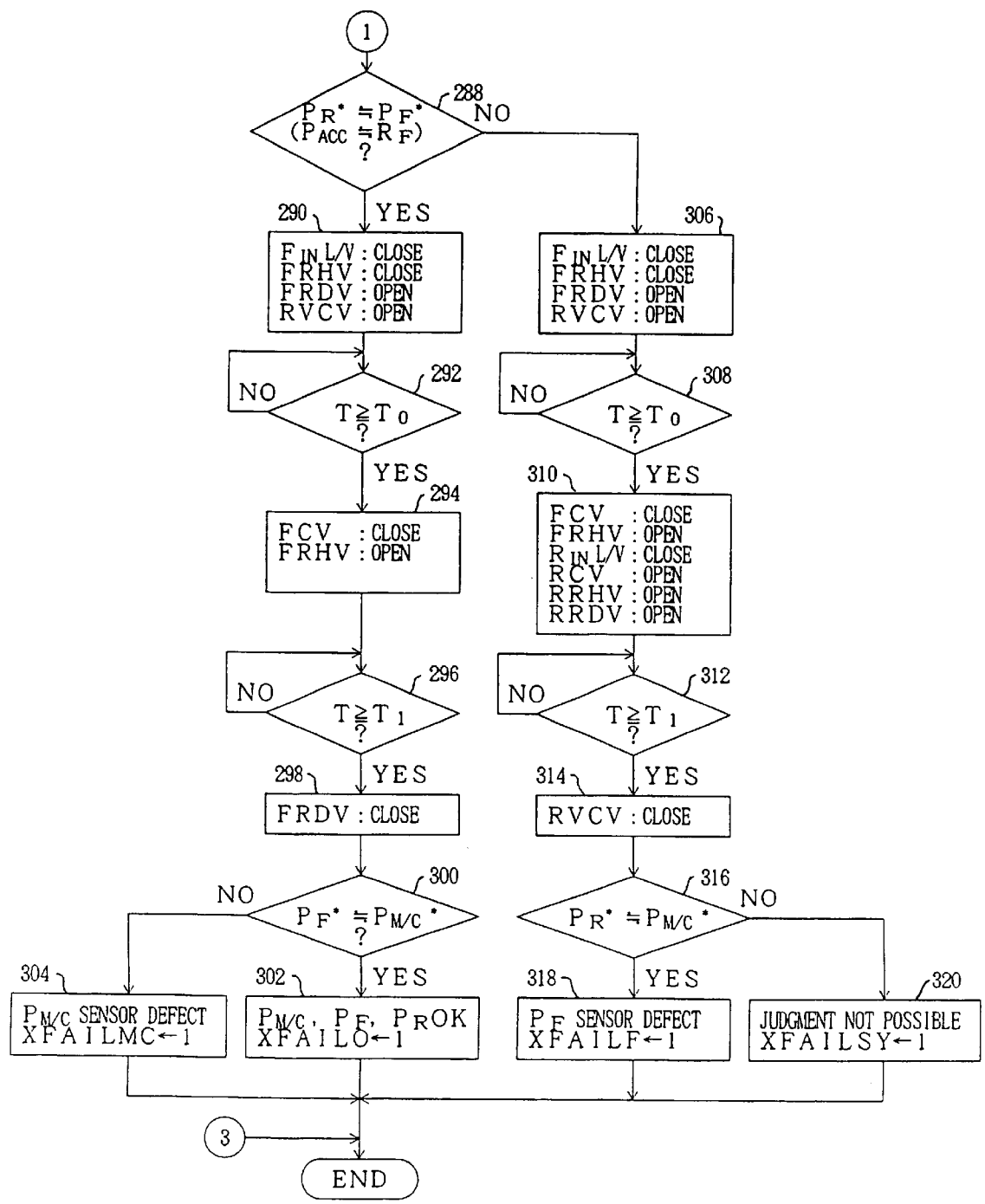
Figure 8C:
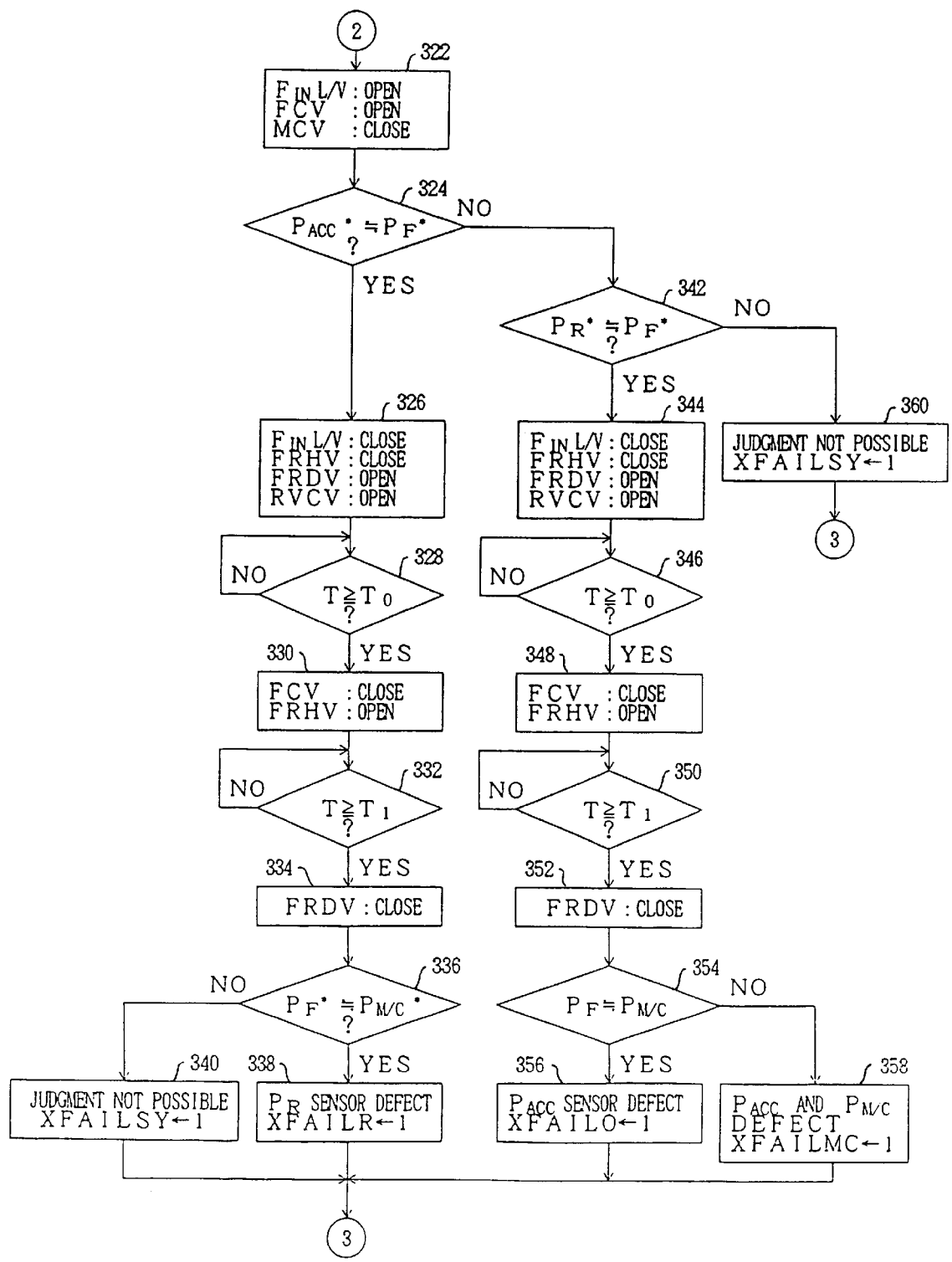

The following is a description of a second embodiment of the sensor operation status determination routine with reference to FIG. 8A through FIG. 8C. The brake fluid pressure control device of the present embodiment uses the configuration of the system described in FIG. 1 and FIG. 2 but the ECU 20 executes, instead of the routine described in FIG. 6, the routine shown in FIG. 8A through FIG. 8C.

FIG. 8A through FIG. 8C are flowcharts for explaining the second embodiment of the routine executed by the ECU 20 in order to perform the sensor operation status check. When this routine starts, the processing of step 280 is first executed. Step 280 is the same as step 220 in that there is a determination of whether or not the determination conditions required prior to the start of the sensor check have been established. If it is determined as a result of this that the determination conditions have been established, then the processing of step 282 is executed.

In step 282, processing is executed to place $R_{IN}$ linear valve 70 in the open status. When this processing is executed, the accumulator pressure $P_{ACC}$ flows into the rear hydraulic path 74. This routine ends when the processing of step 282 is finished.

In step 284, there is a determination of whether or not the detection value $P_{ACC}^*$ for the $P_{ACC}$ sensor 62 and the detection value $P_R^*$ for the $P_R$ sensor 108 are effectively the same value. If the accumulator pressure $P_{ACC}$ is flowing into the rear hydraulic path 74, then both the $P_{ACC}$ sensor 62 and the $P_R$ sensor 108 are normal and both the detection value $P_{ACC}^*$ and the detection value $P_R^*$ should be the same in step 284. Accordingly, if it is determined in step 284 that the detection value $P_{ACC}^*$ and the detection value $P_R^*$ are effectively the same value then it can be determined that both the $P_{ACC}$ sensor 62 and the $P_R$ sensor 108 are functioning normally. In this case, the processing of step 286 is then executed.

In step 286, there is processing to place the $F_{IN}$ linear valve 68 in the open status, the FCV 80 in the open status, and the MCV 46 in the closed status. When this processing is executed, the front hydraulic circuit 82 is isolated from the master cylinder 24 and the accumulator pressure $P_{ACC}$ flows into the front hydraulic circuit 82 and the wheel cylinder 92 and wheel cylinder 98. When this processing ends, the processing of the next step 288 shown in FIG. 8B is executed.

In step 288, there is a determination of whether or not the detection value $P_R^*$ of the $P_R$ sensor 108 (or detection value $P_{ACC}^*$ of the $P_{ACC}$ sensor 62) is effectively the same value as the detection value $P_F^*$ of the $P_F$ sensor 84. The processing of this step 288 is performed under conditions when the $P_{ACC}$ sensor 62, the $P_R$ sensor 108, and the $P_F$ sensor 84 all have the accumulator pressure $P_{ACC}$ acting upon them. Because of this, if the $P_F$ sensor 84 is functioning normally, then that detection value $P_F^*$ will be approximately the same value as the detection value $P_{ACC}^*$ and the detection value $P_R^*$. In other words, if the condition of step 288 is established, then $P_F$ sensor 84 can be determined to be functioning normally. The processing of the following step 290 is executed when this determination has been made.

The processing for step 290 and onwards is executed in order to determine whether or not the $P_{M/C}$ sensor 40 is functioning normally. In step 290, there is processing to place the $F_{IN}$ linear valve 68 in the open status, the front hold valve 88 and front hold valve 94 in the closed status, the front pressure-decrease valve 100 and front pressure-decrease valve 102 in the open status, and the RVCV 106 in the open status. According to this processing, there is no fall in the pressure of the connecting path 86 and it is possible for the wheel cylinder pressure $P_{W/C}$ of the wheel cylinder 92 and wheel cylinder 98 to be released to the reserve tank 38. The processing of step 292 is executed when the processing of step 290 ends.

In step 292 there is a determination of whether or not the elapsed time T has reached a required time $T_0$ after the execution of the processing of step 290. The required time $T_0$ is the time required fro the wheel cylinder pressure $P_{W/C}$ of the wheel cylinder 92 and wheel cylinder 98 to reduce to approximately atmospheric pressure. In step 292, if it is determined that $T \geq T_0$, then the processing of the next step 294 is executed.

In step 294, processing is executed to place the FCV 80 in the closed status and to place the front hold valve 88 and front hold valve 94 in the open status. According to this processing, it is possible to release the fluid pressure inside the front hydraulic circuit 82 to the reserve tank 38. The processing shifts to the execution of step 296 when the processing of step 294 is finished.

In step 296, there is a determination of whether or not the elapsed time T since the execution of the processing of step 294 has reached the required time $T_1$. The required time $T_1$ is the time required for the fluid pressure inside the connecting path 86 to reduce to a pressure which is lower than that of the master cylinder pressure $P_{M/C}$. In step 296, when it is determined that $T \geq T_1$, the processing of step 298 is executed.

In step 298, the processing to close the front pressure-decrease valve 100 and the front pressure-decrease valve 102 is executed. At the time when step 298 is executed, the flow of pressure from the master cylinder 24 to the side of the front hydraulic circuit 82 is permitted by the one-way valve 48. Because of this, when this processing is executed, the internal pressure of the front hydraulic circuit 82, the wheel cylinder pressure $P_{W/C}$ of the wheel cylinder 92 and wheel cylinder 98 and the master cylinder pressure $P_{M/C}$ all become the same value. The processing of step 300 is executed when this processing ends.

In step 300, there is a determination of whether or not for whether the detection value $P_F^*$ of the $P_F$ sensor 84 and the detection value $P_{M/C}^*$ for the $P_{M/C}$ sensor 40 are effectively the same value. If the $P_{M/C}$ sensor 40 is normally operating, then the detection value $P_{M/C}^*$ should be approximately the same as the detection value $P_F^*$. In other words, if the condition of step 300 is established, then it is possible to determine that the $P_{M/C}$ sensor 40 is normally functioning. The processing shifts to the execution of step 302 when this determination is made.

In step 302, "1" is set in the flag XFAIL0. The processing of this step 302 is only executed in the cases when it is recognized that all of the sensors $P_{M/C}$ sensor 40, $P_F$ sensor 84 and $P_R$ sensor 108 are normal. Accordingly, in the system of the present embodiment, if "1" is set for flag XFAIL0, then it is possible to determine that all of those sensors are functioning normally. This routine ends when the processing of step 302 ends.

In step 300, if it is determined that the detection value $P_F^*$ and the detection value $P_{M/C}^*$ are not effectively the same value then it is possible to determine that the detection value $P_{M/C}^*$ of the $P_{M/C}$ sensor 40 is an abnormal value. In this case, the processing of the step 304 is executed after that of step 300.

In step 304, "1" is set in the flag XFAILMC. The processing of step 304 is performed only in the case where $P_F$ sensor 84 and $P_R$ sensor 108 are normal and where it has been recognized that the detection value $P_{M/C}^*$ of the $P_{M/C}$ sensor 40 is an abnormal value. Accordingly, in the system of the present embodiment, when "1" is set in flag XFAILMC, it is possible to determine that the $P_F$ sensor 84 and the $P_R$ sensor 108 are functioning normally. This routine ends when the processing of step 304 is finished.

In step 288, if it is determined that the detection value $P_R^*$ and the detection value $P_F^*$ are not effectively the same value, then it is possible to determine that the detection value $P_F^*$ is an abnormal value. In this case, comparing the detection value $P_R^*$ of the $P_R$ sensor 108 and the detection value $P_{M/C}^*$ of the $P_{M/C}$ sensor 40 enables the determination of whether the $P_{M/C}$ sensor 40 is normal or not, and the processing then shifts to the execution of step 306.

Step 306 and step 308 are the same as step 290 and step 292 in that they execute processing to lower the wheel cylinder pressure $P_{W/C}$ of the wheel cylinder 92 and the wheel cylinder 98 to close to atmospheric pressure. The processing shifts to the execution of step 310 when the processing of this step is completed.

In step 310, the processing places the FCV 80 in the closed status, the front hold valve 88 and front hold valve 94 in the open status, the $R_{IN}$ linear valve 70 in the closed status, the RCV 110 in the open status, the rear hold valve 116 and the rear hold valve 122 in the open status, and the rear pressure-decrease valve 128 and rear pressure-decrease valve 130 in the open status. According to this processing, the fluid pressure inside the connecting path 86 of the front hydraulic circuit 82, the fluid pressure of the rear hydraulic path 74 connecting to the rear hydraulic circuit 112 and the wheel cylinder pressure $P_{W/C}$ of the wheel cylinder 120 and wheel cylinder 126 can be released to the reserve tank 38. The processing shifts to the execution of step 312 when the processing for step 310 is finished.

In step 312, there is a determination of whether or not the elapsed time T since the execution of the processing for step 310 has reached the required time $T_1$. This required time $T_1$ is the time required for the fluid pressure inside the connecting path 86 and the rear hydraulic path 74, and the wheel cylinder pressure $P_{W/C}$ for the wheel cylinder 120 and the wheel cylinder 126 to reach a pressure relatively lower than that of the master cylinder pressure $P_{M/C}$. If in step 312 it is determined that $T \geq T_1$, then the execution shifts to the processing of the next step.

In step 314, there is processing to place the RVCV 106 in the open status. At the time when step 314 is executed, the one-way valve 48 allows fluid pressure to flow from the master cylinder 24 to the side of the front hydraulic circuit 82. In addition, the fluid pressure supplied to the front hydraulic circuit 82 flows into the rear hydraulic circuit 112 via the connecting pipe 104 and reaches the rear hydraulic path 74. This means that when the above processing is executed, the internal pressure of the $P_F$ sensor 84 and the internal pressure of the rear hydraulic path 74 are both the same pressure as that of the master cylinder pressure $P_{M/C}$. The processing shifts to the execution of step 316 when this processing is finished.

In step 316, there is a determination of whether or not the detection value $P_R^*$ of the $P_R$ sensor 108 is effectively the same value as the detection value $P_{M/C}^*$ of the $P_{M/C}$ sensor 40. As described above, the processing for step 316 is performed on the premise that the detection value $P_R^*$ for $P_R$ sensor 108 is normal (refer to step 284). Accordingly, if the $P_{M/C}$ sensor 40 is operating normally, then the detection value $P_{M/C}^*$ and the detection value $P_R^*$ should be approximately the same. In other words, when the condition for step 316 is established, it is possible to determine that the $P_{M/C}$ sensor 40 is operating normally. The processing moves to step 318 when the execution of processing for this step has been completed.

In step 318, "1" is set in the flag XFAILF. The processing for this step is executed only when it is recognized that both the $P_{M/C}$ sensor 40 and the $P_R$ sensor 108 are functioning normally and that the detection value $P_F^*$ of the $P_F$ sensor 84 is an abnormal value. Accordingly, in the system of the present embodiment, when "1" has been set in flag XFAILF, it can be determined that both the $P_{M/C}$ sensor 40 and the $P_R$ sensor 108 are functioning normally. This routine ends when the processing of step 318 is finished.

In step 316, if it is determined that the detection value $P_R^*$ and the detection value $P_{M/C}^*$ are not effectively the same value, then it can be determined that the detection value $P_{M/C}^*$ of the $P_{M/C}$ sensor 40 is an abnormal value. In this case, the processing of step 320 is executed after step 316.

In step 320, "1" is set in the flag XFAILSY. The processing of step 304 is executed only in the case where it is recognized that the detection value $P_F^*$ of the $P_F$ sensor 84 and the detection value $P_{M/C}^*$ of the $P_{M/C}$ sensor 40 are both abnormal values. If the detection value $P_F^*$ of the P sensor 84 and the detection value $P_{M/C}^*$ of the $P_{M/C}$ sensor 40 are both abnormal values then it is not possible to accurately detect the master cylinder pressure $P_{M/C}$. Accordingly, it is not possible to execute dynamic control for either the front hydraulic circuit 82 or the rear hydraulic circuit 112. Because of this, under the condition where it is not possible to determine the location of the malfunction, "1" is set in the flag XFAILSY. This routine ends when the processing of step 320 is finished.

In step 284 (refer to FIG. 8A), when it is determined that the detection value $P_{ACC}$ for the $P_{ACC}$ sensor 62 and the detection value $P_R^*$ or the $P_R$ sensor 108 are not effectively the same value, the processing of step 322 and shown in FIG. 8C is executed.

In step 322, processing is executed to place the $F_{IN}$ linear valve 68 in the open status, the FCV 80 in the open status and the MCV 46 in the closed status. According to this processing, it is possible for the accumulator pressure $P_{ACC}$ to be directed to the connecting path 86 of the front hydraulic circuit 82 and to the wheel cylinder 92 and wheel cylinder 98. The processing shifts to the execution of step 324 when this processing is finished.

In step 324, there is a determination of whether or not the detection value $P_{ACC}^*$ for the $P_{ACC}$ sensor 62 and the detection value $P_F^*$ for the $P_F$ sensor 84 are effectively the same value. The processing of step 324 is performed under the condition where the accumulator pressure $P_{ACC}$ acts on both the $P_{ACC}$ sensor 62 and the $P_F$ sensor 84. Because of this, if the $P_{ACC}$ sensor 62 and the $P_F$ sensor 84 are both functioning normally, then the values for the detection value $P_{ACC}$ and the detection value $P_F^*$ should be approximately the same. In other words, if the condition for this step 324 is established, then it is possible to determine that $P_{ACC}$ sensor 62 and $P_F$ sensor 84 are functioning normally and that the detection value $P_R^*$ of the $P_R$ sensor 108 is an abnormal value. The processing shifts to the execution of step 326 when this determination has been made.

The processing of steps 326 through 336 is executed in order to determine whether or not the $P_{M/C}$ sensor 40 is operating normally. Moreover, this processing is no different from the processing of steps 290 through 300 as described above and a duplicate description will not be given.

If the processing of steps 326 through 336 is executed and it is determined in step 336 that the detection value $P_F^*$ of the $P_F$ sensor 84 and the detection value $P_{M/C}^*$ of the $P_{M/C}$ sensor 40 are effectively the same value, then it can be determined that the $P_{M/C}$ sensor 40 is functioning normally. The processing shifts to the execution of step 338 in this case.

In step 338, "1" is set in the flag XFAILR. The processing of this step 339 is executed when it is recognized that the $P_{M/C}$ sensor 40 and the $P_F$ sensor 84 are operating normally and that the detection value $P_R^*$ of the $P_R$ sensor 108 is an abnormal value. Accordingly, in the system of the present embodiment, when "1" is set in the flag XFAILR, it can be determined that the $P_{M/C}$ sensor 40 and the $P_F$ sensor 84 are functioning normally. This routine ends when the processing of step 338 ends.

In step 336, if it is determined that the detection value $P_F^*$ and the detection value $P_{M/C}^*$ are not effectively the same value, it is possible to determine that the detection value $P_{M/C}^*$ of the $P_{M/C}$ sensor 40 is an abnormal value. The processing then shifts to step 340.

In step 340, "1" is set in the flag XFAILSY. The processing of this step 340 is executed only in the case when it is determined that both the detection value $P_R^*$ of the $P_R$ sensor 108 and the detection value $P_{M/C}^*$ of the $P_{M/C}$ sensor 40 are abnormal values. In this case, it is not possible to execute dynamic control for either the front hydraulic circuit 82 or the rear hydraulic circuit 112. Because of this, when there is such a situation, "1" is set in the flag XFAILSY in the same manner as for the case when it was not possible to determine the location of a malfunction. This routine ends when the processing of step 340 is finished.

In step 324, if it is determined that the detection value $P_{ACC}^*$ and the detection value $P_F^*$ are effectively the same value, then it is possible to determine that at least the detection value $P_{ACC}^*$ is an abnormal value. In this case, the processing then shifts to the execution of step 342.

In step 342, there is a determination of whether or not the detection value $P_R^*$ of the $P_R$ sensor 108 and the detection value $P_F^*$ of the $P_F$ sensor 84 are effectively the same value. The processing of step 342 is performed under the condition where the accumulator pressure $P_{ACC}$ is acting on both the $P_R$ sensor 108 and the $P_F$ sensor 84. Because of this, if the $P_R$ sensor 108 and the $P_F$ sensor 84 are functioning normally, then both the detection value $P_R^*$ and the detection value $P_F^*$ will be approximately the same value. In other words, it is possible to determine that both the $P_R$ sensor 108 and the $P_F$ sensor 84 are functioning normally if the condition of step 342 is established. The processing then shifts to the execution of step 344 when this determination is made.

The processing of steps 344 through 354 is executed in order to determine whether the $P_{M/C}$ sensor 40 is functioning normally. Moreover, this processing is no different from the processing of steps 290 through 300 and described above and a duplicate description will be omitted.

The processing of steps 344 through 354 is executed and in step 354, when it is determined that the detection value $P_F^*$ of the $P_F$ sensor 84 and the detection value $P_{M/C}^*$ of the $P_{M/C}$ sensor 40 are effectively the same, then it can be determined that the $P_{M/C}$ sensor 40 is functioning normally. In this case, the processing shifts to the execution of step 356.

In step 356, "1" is set in the flag XFAILO. The processing of step 356 is executed when the $P_{M/C}$ sensor 40, the $P_F$ sensor 84 and the $P_R$ sensor 108 are functioning normally and when it has been recognized that the detection value $P_{ACC}^*$ of the $P_{ACC}$ sensor 62 is an abnormal value. The ECU 20 executes dynamic and precise control for the front hydraulic circuit 82 and the rear hydraulic circuit 112 on the basis of the detection value $P_{M/C}^*$, detection value $P_F^*$ and detection value $P_R^*$ even if there is an abnormal value for the detection value $P_{ACC}^*$ of the $P_{ACC}$ sensor 62. Because of this, "1" is set in the flag XFAILO to express that it is possible in this step to provide a control the same as the case for when the system is normal. This routine ends when the processing of step 356 is finished.

In step 354 when it is determined that the detection value $P_F^*$ and the detection value $P_{M/C}^*$ are not effectively the same value, it is possible to determine that the detection value $P_{M/C}^*$ of the $P_{M/C}$ sensor 40 is an abnormal value. In this case, the processing shifts to the execution of step 358.

In step 358, "1" is set in the flag XFAILMC. The processing of this step 358 is executed only in the case when both the detection value $P_F^*$ for the $P_F$ sensor 84 and the detection value $P_R^*$ of the $P_R$ sensor 108 are both normal and when it is recognized that the detection value $P_{M/C}^*$ of the $P_{M/C}$ sensor 40 is an abnormal value. Accordingly, in the system of the present embodiment, when "1" is set in the flag XFAILMC, it is possible to determine that the $P_F$ sensor 84 and the $P_R$ sensor 108 are both functioning normally. This routine ends when the processing of step 358 is finished.

In step 342, if it is determined that the detection value $P_R^*$ and the detection value $P_F^*$ are effectively not the same value, then it can be determined that one of the $P_{ACC}$ sensor 62, $P_F$ sensor 84 and the $P_R$ sensor 108 is giving an abnormal value. In this embodiment, it is not possible to determine the location of the malfunction when a situation such as this has been detected. Because of this, "1" is set in the flag XFAILSY in step 360 when there is a situation such as this, and the routine ends.

During this processing, the operating status of the $P_{ACC}$ sensor 62, $P_F$ sensor 84 and $P_R$ sensor 108 is determined on the basis of comparing the three detection values (in steps 282 through 288, 322 and 324). This processing is performed using the accumulator 56 as the hydraulic pressure source. Accordingly, when this processing is executed it is not necessary for the brake pedal 22 to be depressed. Because of this, in the present embodiment, the duration for the execution of a sensor check for the $P_{ACC}$ sensor 62, $P_F$ sensor 84 and the $P_R$ sensor 108 is not limited to the time that the brake pedal is depressed. At this point, the brake fluid pressure control device of the present embodiment has the advantage of a superior level of freedom when compared to the brake fluid pressure control device of the first embodiment as far as the duration for execution of the sensor check is concerned.

As has been described above, the brake fluid pressure control device of the present embodiment is the same as the brake fluid pressure control device of the first embodiment in that it is possible to set flags in accordance with whether or not the $P_{M/C}$ sensor 40, $P_F$ sensor 84 and $P_R$ sensor 108 are functioning normally. In this embodiment, the ECU 20 executes a piping check in the same manner as for the first embodiment, and determines the method most suitable for the brake fluid pressure control on the basis of the results of the piping check and the results of the sensor check. Because of this, the brake fluid pressure control device of the present embodiment is like the brake fluid pressure control device of the first embodiment in that it can maintain superior braking performance when compared to devices which stop dynamic control when some malfunction has occurred in the system.

Figure 9A:
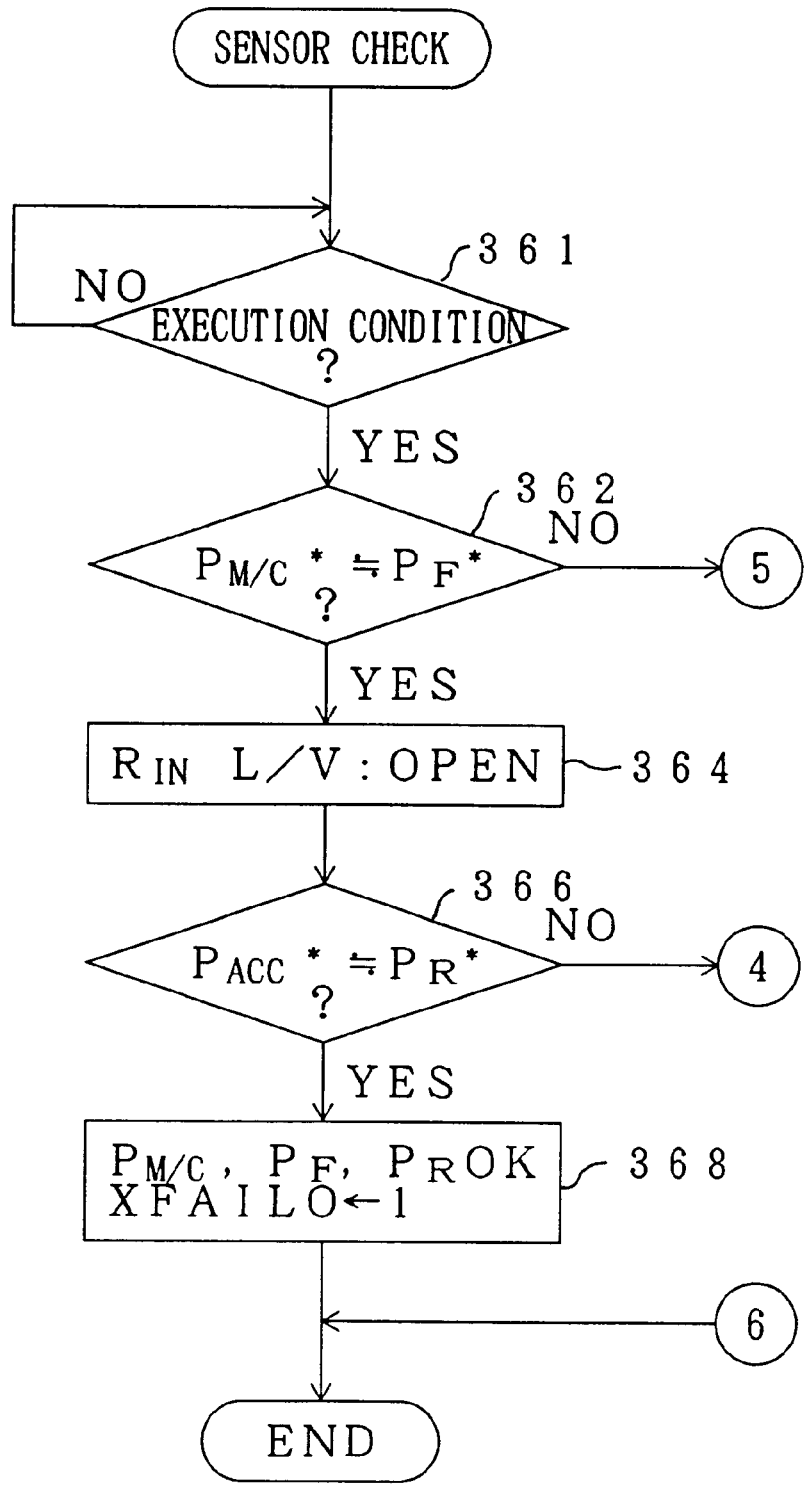
FIG. 9A, FIG. 9B and FIG. 9C are flowcharts for explaining a third embodiment of the sensor operation status determination routine executed by the brake fluid pressure control device shown in FIG. 1.
Figure 9B:
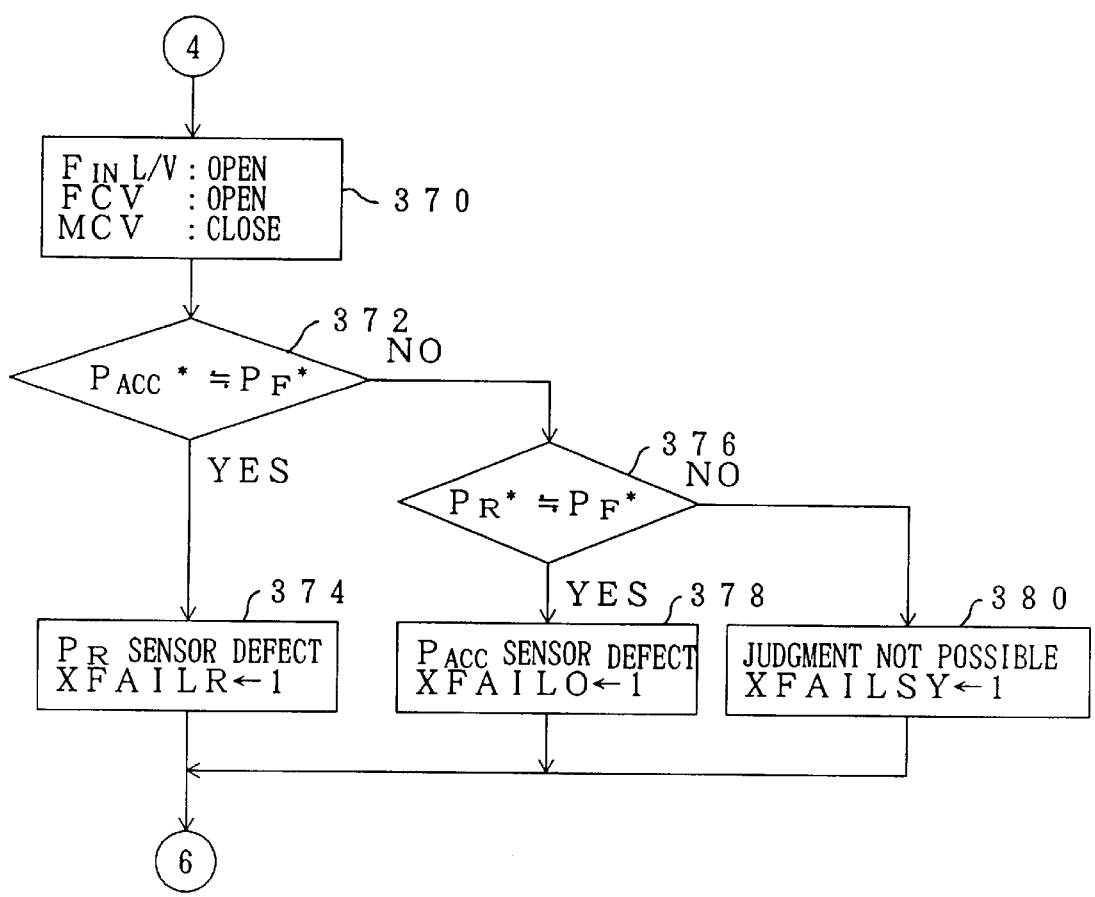
Figure 9C:
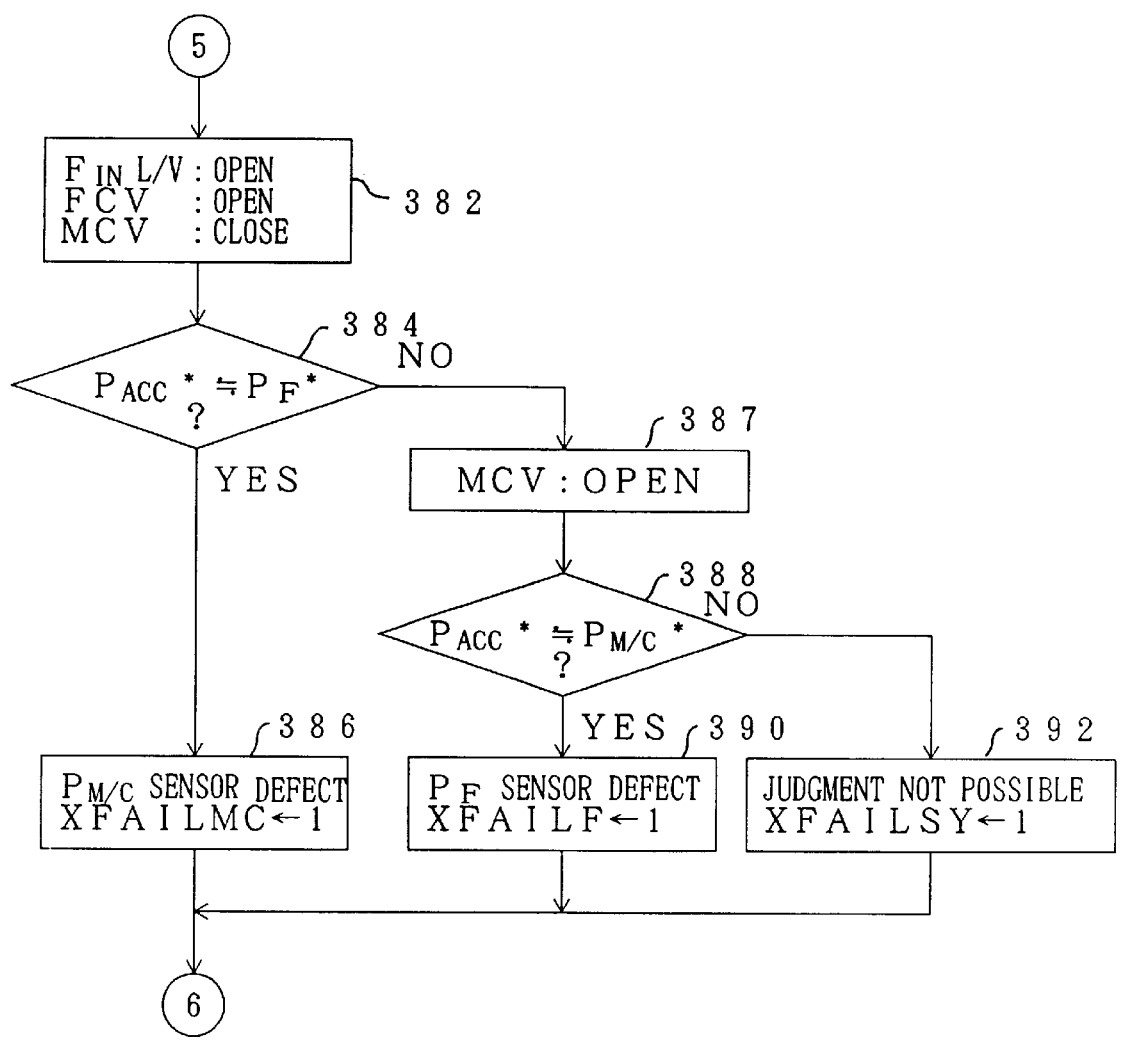

The following is a description of a third embodiment of the sensor operation status determination routine with reference to FIG. 9A through FIG. 9C. The brake fluid pressure control device of the present embodiment uses the system configuration shown in FIG. 1 and FIG. 2 but the ECU 20 executes, instead of the routine shown in FIG. 6 or the routine shown in FIG. 8A through FIG. 8C, the routine shown in FIG. 9A through FIG. 9C.

FIG. 9A through FIG. 9C are flowcharts for explaining the routine executed by the ECU 20 in order to perform the sensor operation status check. When this routine is started, the processing of step 361 is first executed. Step 361 is the same as the case for step 220 (FIG. 6) or step 280 (FIG. 8A) in that there is a determination of whether or not the determination condition required prior to the start of the sensor check is established. If as a result it is determined that the determination condition is established, then the processing shifts to the execution of step 362.

In step 362, there is a determination of whether or not the detection value $P_{M/C}^*$ for the $P_{M/C}$ sensor 40 and the detection value $P_F^*$ for the $P_F$ sensor 84 are effectively the same value. If as a result it is determined that they are approximately the same value then it can be determined that the $P_{M/C}$ sensor 40 and the $P_F$ sensor 84 are operating normally. The processing then shifts to the execution of step 364.

In step 364, the processing is the same as that of step 282 (FIG. 8A) in that it is processing to place the $R_{IN}$ linear valve 70 in the open status. When this processing is executed, the accumulator pressure $P_{ACC}$ flows into the rear hydraulic path 74. Processing then shifts to execution of step 366 when the processing of step 364 is completed.

In step 366, there is a determination of whether or not the detection value $P_{ACC}^*$ for the $P_{ACC}$ sensor 62 and the detection value $P_R^*$ for the $P_R$ sensor 108 are effectively the same value. If as a result of this it is determined that the two are approximately the same value, then it is possible to determine that both the $P_{ACC}$ sensor 62 and the $P_R$ sensor 108 are functioning normally. In this case, the processing shifts to the execution of step 368.

The processing of step 368 is executed only in the case when it is recognized that the $P_{M/C}$ sensor 40, $P_F$ sensor 84 and the $P_R$ sensor 108 are all functioning normally.

Accordingly, in step 368, "1" is set in the flag XFAILO to express that the system is functioning normally. This routine ends when the processing of step 368 is finished.

If it is determined in step 366 that the detection value $P_{ACC}*$ and the detection value $P_R*$ are not effectively the same value, then the processing of step 370 shown in FIG. 9B is executed. The processing of step 370 is the same as that of step 286 (FIG. 8A) in that it is executed only when the accumulator pressure $P_{ACC}$ acts on the front hydraulic circuit 82 and on the wheel cylinder 92 and wheel cylinder 98. When this processing is finished, the processing of step 372 is executed.

In step 372, there is a determination of whether or not the detection value $P_{ACC}*$ for the $P_{ACC}$ sensor 62 and the detection value $P_F*$ of the $P_F$ sensor 84 are effectively the same value. If as a result it is determined that the detection value $P_{ACC}*$ for the $P_{ACC}$ sensor 62 and the detection value $P_F*$ of the $P_F$ sensor 84 are effectively the same value, then it can be determined that the $P_F$ sensor 84, the master cylinder pressure $P_{M/C}$ and the $P_{ACC}$ sensor 62 are all functioning normally, and that the detection value $P_R*$ for the $P_R$ sensor 108 is an abnormal value. The processing then shifts to the execution of step 374.

In step 374, "1" is set in the flag XFAILR to express that the detection value $P_R*$ of the $P_R$ sensor 108 is an abnormal value. This routine ends when the processing of step 374 is finished.

In step 372, if it is determined that the detection value $P_{ACC}*$ and the detection value $P_F*$ are not effectively the same value, then it can be determined that the detection value $P_{ACC}*$ is an abnormal value. In this case, a determination is made for whether or not the detection value $P_R*$ of the $P_R$ sensor 108 is an normal value and then the processing of step 376 is executed.

As described above, the ECU 20 can use the detection value $P_{M/C}*$, detection value $P_F*$ and detection value $P_R*$ for the other three sensors to execute dynamic control for the front hydraulic circuit 82 and the rear hold valve 122 with good precision even if the detection value $P_{ACC}*$ of the $P_{ACC}$ sensor 62 is an abnormal value. Because of this, in step 378, "1" is set in the flag XFAILO to indicate that the system is normal. This routine ends when the processing of step 378 is finished.

In step 376, if it is determined that the detection value $P_R*$ and the detection value $P_F*$ are effectively not the same value, then it can be determined that not only is the detection value $P_{ACC}*$ for the $P_{ACC}$ sensor 62 abnormal but so is the detection value $P_R*$ for the $P_R$ sensor 108. In this case, in the later step 380, "1" is set in the flag XFAILSY to express that it cannot be determined which is the abnormal value.

In step 362, when it is determined that the detection value $P_{M/C}*$ and the detection value $P_F*$ are effectively not the same value, then it can be determined that at least one of the detection value $P_{M/C}*$ and the detection value $P_F*$ is an abnormal value. In this case, the processing of step 382 shown in FIG. 9C is executed. Step 382 is the same as step 286 (FIG. 8A) in that the accumulator pressure $P_{ACC}$ is directed to the front hydraulic circuit 82 and to the wheel cylinder 92 and wheel cylinder 98. The processing of step 384 is executed when this processing ends.

In step 384, there is a determination of whether or not the detection value $P_{ACC}*$ of the $P_{ACC}$ sensor 62 and the detection value $P_F*$ of the $P_F$ sensor 84 are effectively the same value. As a result, if it is determined that both are effectively the same value, then the $P_F$ sensor 84 and the master cylinder pressure $P_{M/C}$ are functioning normally and the detection value $P_{M/C}*$ for the $P_{M/C}$ sensor 40 can be determined to be an abnormal value. In this case, the processing of the step 386 is executed.

In step 386, "1" is set in the flag XFAILMC to indicate that the detection value $P_{M/C}*$ of the $P_{M/C}$ sensor 40 is an abnormal value. This routine ends when the processing of step 386 is finished.

In the step 384, when it is determined that the detection value $P_{ACC}*$ and the detection value $P_F*$ are effectively not the same value, then the processing of step 387 is executed. In step 387, there is processing to open the MCV 46, and lead the accumulator pressure $P_{ACC}$ to the second hydraulic chamber 34 of the master cylinder 24. The processing of step 388 is then executed when the processing for step 387 is finished.

In step 388, there is a determination of whether or not the detection value $P_{ACC}*$ of the $P_{ACC}$ sensor 62 and the detection value $P_{M/C}*$ of the $P_{M/C}$ sensor 40 are effectively the same value. If as a result it is determined that the two are not effectively the same value, then it can be determined that the $P_{ACC}$ sensor 62 and the $P_{M/C}$ sensor 40 are normal and that the detection value $P_F*$ is an abnormal value. The processing of step 390 is then executed.

In step 390, "1" is set in the flag XFAILF to express that the detection value $P_F*$ of the $P_F$ sensor 84 is an abnormal value. This routine ends when the processing of step 390 is finished.

In step 388, when it is determined that the detection value $P_{ACC}*$ and the detection value $P_{M/C}*$ are effectively not the same value, then it can be determined that the $P_{ACC}$ sensor 62, the $P_{M/C}$ sensor 40 and the $P_F$ sensor 84 are outputting different values. In this case, in step 392, "1" is set in the flag XFAILSY to express that it is not possible to determine the malfunction.

As has been described above, in the brake fluid pressure control device of the present embodiment, and as in the case for the first and the second embodiments, it is possible to set flags in accordance with whether or not the $P_{M/C}$ sensor 40, $P_F$ sensor 84, and $P_R$ sensor 108 are operating normally. In the present embodiment, the ECU 20 executes a piping or conduit check in the same manner as in the first and second embodiments, and uses the results of the piping check and the results of the sensor check to determine the optimum brake fluid pressure control method. Because of this, as with the first embodiment and the second embodiment of the brake fluid pressure control device, it is possible to maintain superior braking performance when compared to devices which always stop dynamic control when some sort of malfunction has occurred in the system.

Further, the present invention is not limited to the above-described embodiments, and variations and modifications may be made without departing from the present invention.

What is claimed is:

1. A brake fluid pressure control device comprising:
   a first-system hydraulic circuit linked to a first-system wheel cylinder;
   a second-system hydraulic circuit linked to a second-system wheel cylinder;
   a first pressure sensor outputting a first value corresponding to a pressure in the first-system wheel cylinder;
   a second pressure sensor outputting a second value corresponding to a pressure in the second-system wheel cylinder;
   a connection path between the first-system wheel cylinder and the second-system wheel cylinder, the configuration of the connection path determining a status of fluid communication between the first-system wheel cylinder and the second-system wheel cylinder;

a hydraulic pressure source;

a hydraulic pressure source sensor outputting a source value corresponding to a brake fluid pressure generated by the hydraulic pressure source; and a sensor operation status determination unit which, when the hydraulic pressure source is generating brake fluid pressure, compares the first and source values while the brake fluid pressure is not supplied between the first-system wheel cylinder and the second-system wheel cylinder via the connection path, compares the first and second values while the brake fluid pressure is supplied from the first-system wheel cylinder to the second-system wheel cylinder via the connection path and determines an operational status of the hydraulic pressure source sensor, the first pressure sensor and the second pressure sensor based on the comparison of the source, first and second values.

2. A brake fluid pressure control device according to claim 1, wherein said hydraulic pressure source is a master cylinder.

3. A brake fluid pressure control device according to claim 1, wherein said hydraulic pressure source is a high pressure source which generates a brake fluid pressure independent of brake operation.

4. A brake fluid pressure control device according to claim 1, wherein said brake fluid pressure control device comprises a circuit defect detection unit for detecting defects in said first-system hydraulic circuit, said second-system hydraulic circuit and said connection path.

5. A brake fluid pressure control device according to claim 1, wherein said hydraulic pressure source is a master cylinder, and said hydraulic pressure source sensor is a master cylinder pressure sensor.

6. A brake fluid pressure control device according to claim 1, wherein said hydraulic pressure source is a high pressure source which generates a brake fluid pressure independent of brake operation, and said hydraulic pressure source sensor is an accumulator pressure sensor.

7. A brake fluid pressure control device according to claim 1, wherein said first-system wheel cylinder comprises left and right front wheel cylinders and said second-system wheel cylinder comprises left and right rear wheel cylinders, and wherein the brake fluid pressure generated by said hydraulic pressure source is supplied to said front and said rear wheel cylinders via the connection path.

8. A brake fluid pressure control device according to claim 1, wherein said first-system wheel cylinder comprises left and right front wheel cylinders and said second-system wheel cylinder comprises left and right rear wheel cylinders, and wherein said hydraulic pressure source is a high pressure source which generates a brake fluid pressure responsive to a drive signal, said brake fluid pressure being supplied to said front and said rear wheel cylinders via the connection path, said high pressure source comprising a pump and an actuating motor, front linear valves connected to the front wheel cylinders via a front cut valve, and rear linear valves connected to the rear wheel cylinders via a rear cut valve.

9. A brake fluid pressure control device according to claim 1, wherein a reserve tank cut valve is provided in a return passage between said first-system and said second-system wheel cylinders and a reserve tank, and a plurality of pressure-decrease valves are provided between said first-system and said second-system wheel cylinders and the reserve tank cut valve.

10. A brake fluid pressure control device, comprising:

a first-system hydraulic circuit linked to a first-system wheel cylinder, a second-system hydraulic circuit linked to a second-system wheel cylinder, a first pressure sensor outputting a first value corresponding to a pressure in the first-system wheel cylinder;

a second pressure sensor outputting a second value corresponding to a pressure in the second-system wheel cylinder;

a connection path between the first-system wheel cylinder and the second-system wheel cylinder, the configuration of the connection path determining a status of fluid communication between the first-system wheel cylinder and the second-system wheel cylinder;

a hydraulic pressure source;

a hydraulic pressure source sensor outputting a source value corresponding to a brake fluid pressure generated by the hydraulic pressure source; and a sensor operation status determination unit which, when the hydraulic pressure source is generating brake fluid pressure, compares the first, second and source values and determines an operational status of the hydraulic pressure source sensor, the first-system wheel cylinder pressure sensor and the second-system wheel cylinder pressure sensor, wherein said connection path is provided with a connecting pipe, a first-system pressure decrease valve which opens and closes said connecting pipe to and from said first-system wheel cylinder, and a second-system pressure decrease valve which connects and disconnects said connecting pipe to and from said second-system wheel cylinder, and wherein said brake fluid pressure control device comprises a connecting pipe defect detection unit wherein when said first-system pressure decrease valve is closed and pressure is supplied to said first-system wheel cylinder, said first-system pressure decrease valve opens proportionally to a detection value obtained by said first-system wheel cylinder pressure sensor, and when said second-system pressure decrease valve is closed and pressure is supplied to said first-system wheel cylinder, it is determined that a defect exists in said first-system connecting pipe when a fluid pressure detected by said first-system wheel cylinder pressure sensor is less than a predetermined pressure.

11. A brake fluid pressure control device according to claim 10, wherein said hydraulic pressure source is a master cylinder.

12. A brake fluid pressure control device according to claim 10, wherein said hydraulic pressure source is a high pressure source which generates a brake fluid pressure independent of brake operation.

13. A brake fluid pressure control device according to claim 10, wherein said hydraulic pressure source is a master cylinder, and said hydraulic pressure source sensor is a master cylinder pressure sensor.

14. A brake fluid pressure control device according to claim 10, wherein said hydraulic pressure source is a high pressure source which generates a brake fluid pressure independent of brake operation, and said hydraulic pressure source is an accumulator pressure sensor.

15. A brake fluid pressure control device according to claim 10, wherein said first-system wheel cylinder comprises left and right front wheel cylinders and said second-system wheel cylinder comprises left and right rear wheel cylinders, and wherein the brake fluid pressure generated by said hydraulic pressure source is supplied to said front and said rear wheel cylinders via the connection path.

16. A brake fluid pressure control device according to claim 10, wherein said first-system wheel cylinder comprises left and right front wheel cylinders and said second-system wheel cylinder comprises left and right rear wheel cylinders, and wherein said hydraulic pressure source is a high pressure source which generates a brake fluid pressure responsive to a drive signal, said brake fluid pressure being supplied to said front and said rear wheel cylinders via the connection path, said high pressure source comprising a pump and an actuating motor, front linear valves connected to the front wheel cylinders via a front cut valve, and rear linear valves connected to the rear wheel cylinders via a rear cut valve.

17. A brake fluid pressure control device according to claim 10, wherein a reserve tank cut valve is provided in a return passage between said first-system and said second-system wheel cylinders and a reserve tank, and a plurality of pressure-decrease valves are provided between said first-system and said second-system wheel cylinders and the reserve tank cut valve.

* * * * *